US010144496B2

(12) United States Patent
Smith et al.

(10) Patent No.: US 10,144,496 B2
(45) Date of Patent: Dec. 4, 2018

(54) STRAIGHT LINE GORE, METHOD FOR MAKING THE SAME AND ASSEMBLIES INCLUDING THE SAME

(71) Applicant: Raven Industries, Inc., Sioux Falls, SD (US)

(72) Inventors: Michael Scott Smith, Sulphur Springs, TX (US); Michael William Zimmerman, Greenville, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 201 days.

(21) Appl. No.: 14/830,538

(22) Filed: Aug. 19, 2015

(65) Prior Publication Data
US 2017/0050716 A1    Feb. 23, 2017

(51) Int. Cl.
*B64B 1/58*    (2006.01)
*B64B 1/40*    (2006.01)
*F04B 45/02*   (2006.01)

(52) U.S. Cl.
CPC .......... *B64B 1/58* (2013.01); *B64B 1/40* (2013.01); *F04B 45/02* (2013.01)

(58) Field of Classification Search
CPC .... B64B 1/40; B64B 1/58; B64B 1/00; B64B 1/62; B64B 1/14; B64B 1/42; B64B 1/02; B64B 1/18; F04B 45/02
See application file for complete search history.

(56) References Cited

U.S. PATENT DOCUMENTS

| 4,877,205 | A   |   | 10/1989 | Rand    |            |
|-----------|-----|---|---------|---------|------------|
| 5,104,059 | A   | * | 4/1992  | Rand    | B64B 1/42  |
|           |     |   |         |         | 244/126    |
| 6,360,988 | B1  | * | 3/2002  | Monroe  | B64B 1/42  |
|           |     |   |         |         | 244/31     |
| 6,685,136 | B2  | * | 2/2004  | Yajima  | B64B 1/58  |
|           |     |   |         |         | 244/31     |
| 8,186,625 | B2  | * | 5/2012  | De Jong | B64G 1/222 |
|           |     |   |         |         | 244/158.3  |

(Continued)

FOREIGN PATENT DOCUMENTS

WO    2017031452    2/2017

OTHER PUBLICATIONS

"International Application Serial No. PCT/US2016/047850, International Search Report dated Dec. 30, 2016", 4 pgs.

(Continued)

*Primary Examiner* — Assres H Woldemaryam
(74) *Attorney, Agent, or Firm* — Schwegman Lundberg & Woessner, P.A.

(57) ABSTRACT

An atmospheric balloon includes an upper apex and a lower apex and a balloon membrane. The balloon membrane includes a plurality of balloon gores. The balloon gores extend between the upper and lower apexes. One or more of the balloon gores includes upper straight line gore edges and lower straight line gore edges. The upper and lower straight line gore edges are coupled along one or more corresponding upper and lower straight line gore edges of adjacent balloon gores of the plurality of balloon gores. The one or more balloon gores are formed with cutting the gore material along a straight line cutting edge to form the upper and lower straight line gore edges.

10 Claims, 11 Drawing Sheets

(56) References Cited

U.S. PATENT DOCUMENTS

| 8,814,084 B2* | 8/2014 | Shenhar | A63H 27/10 |
| | | | 244/128 |
| 2010/0012772 A1* | 1/2010 | Izutsu | B64B 1/44 |
| | | | 244/31 |
| 2014/0158823 A1 | 6/2014 | Smith et al. | |
| 2014/0360660 A1 | 12/2014 | Latham et al. | |

OTHER PUBLICATIONS

"International Application Serial No. PCT/US2016/047850, Invitation to Pay Additional Fees and Partial Search Report dated Oct. 3, 2016", 2 pgs.

"International Application Serial No. PCT/US2016/047850, Written Opinion dated Dec. 30, 2016", 7 pgs.

Pagitz, M., et al., "Computation of Buckling Pressure of Pumpkin Balloons", *47th AIAA/ASCE/AHS/ASC Structures, Structural Dynamics, and Materials Conference*, May 1-4, 2006, Newport, Rhode Island, (2006), 22 pgs.

Pagitz, M., et al., "Shape Optimization of "Pumpkin" Balloons", *AIAA Balloon Systems Conference*, May 21-24, 2007, (2007), 17 pgs.

"International Application Serial No. PCT/US2016/047850, International Preliminary Report on Patentability dated Jul. 31, 2017", 7 pgs.

\* cited by examiner

STRAIGHT LINE GORE, METHOD FOR MAKING THE SAME AND ASSEMBLIES INCLUDING THE SAME

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to gore panels used with inflatable articles including atmospheric balloons and structural articles.

BACKGROUND

Atmospheric balloons are constructed with longitudinal tendons and pliable materials cut and bonded to achieve a desired shape (e.g., a lobed pumpkin shape). Atmospheric balloons and other articles are inflated and maintained for long periods of time. In some examples gores are cut and assembled to form the lobes of the balloon membrane, for instance with a constant lobe radius or constant lobe angle construction method. The lobed shape of the constant lobe angle or constant lobe radius gores is configured to mitigate hoop stress on the materials and joints of the balloon.

An atmospheric balloon or article including constant lobe angle type gores uses lofted curves to form the constant lobe angle of the gore from the upper and lower ends of the gore (e.g., the apexes of a balloon) to the balloon equator. Stated another way, when measured from one edge of the gore to the opposed edge the constant lobe angle gore (a component gore of an overall balloon or article) will have a constant angular measurement between the each of the opposed sides from the apexes to the equator (or midpoint) of the gore. To achieve this constant angular measurement the gore material is cut with a precise mathematically derived curved line pattern along each of the opposed edges. The curved line pattern is generated according to mathematical formulae and is based on the desired length and width of the balloon or article. When the gore, cut with the curved line pattern, is incorporated into a balloon and the balloon is inflated the angular measurement between the opposed edges of the gore remains the same from the apexes to the equator while the effective radius of the arc of the gore material changes from the apexes to the equator (increases).

Another example of an atmospheric balloon includes gores constructed with a constant lobe radius type gores that use lofted curves to provide a constant lobe radius. In contrast to the constant lobe angle gores, the constant lobe radius gores have a constant radius (when the balloon or article is inflated) from the apexes to the equator while the angular measurements of the constant lobe radius gores vary. For instance, the constant lobe radius gores have a constant radius measurement (based on the shape of the arc of the gore relative to a center point of the arc) from the apexes to the equator while the angle measurements between the opposed edges of the gore increase from the apexes to the equator. In a similar manner to the constant lobe angle gores described above, the constant lobe radius gores are constructed by cutting the gore material along a precise mathematically derived curved line pattern (based on the desired length and width of the balloon or article) that ensures, when inflated, the gore will have a constant lobe radius.

Overview

The present inventors have recognized, among other things, that a problem to be solved can include decreasing the difficulty of scaling balloon construction. Balloons and articles including gores in their construction use constant lobe radius or constant lobe angle construction methods. Both constant lobe angle and constant lobe radius methods use precise curved cutting patterns to generate corresponding constant lobe angle or constant lobe radius balloons. Stated another way, sheets of gore material are laid out on a flat fabrication table and the gore material is cut according to a template having curved cutting lines generated with mathematical formulae based on a desired balloon article length and width. For larger or smaller balloons (with differing lengths, widths, numbers of gores or the like) the templates do not scale. Instead, separate templates must be generated according to repeated computation of the curved line shape based on the desired balloon or article length, width, number of gores or the like. The generation of templates, use of the same for varying sizes of balloons and the like is time consuming and labor intensive.

In an example, the present subject matter can provide a solution to this problem, such as by using a straight line gore construction. The resulting balloon or article has a consistent construction for the component gores with each gore having straight line gore edges. The straight line gore edges are maintained from the apexes of the balloon to the equator. For instance, the straight line gore edges have a consistent angle relative to a midline of the respective gore between the apex (upper and lower) and the equator. The cutting pattern for the shape does not include curved lines (other than optional fillets at ends of the gores) and is thereby readily scalable. In one example, the angle of a straight line cutting edge of a fabrication assembly (e.g., a fabrication surface) is maintained for larger or smaller balloons and the straight line cutting edge is correspondingly extended or retracted along the angle of the straight line cutting edge. Complex repeated computations of curved cutting lines and generation of corresponding gore templates for differing sized balloons or articles are thereby avoided.

The present inventors have recognized, among other things, that another problem to be solved can include decreasing clefting of balloons and articles through inflation. As previously discussed, constant lobe radius and constant lobe angle gores are constructed by cutting gore material along curved line patterns. Failure to accurately model the curved line or cut along the curved line can generate gores with excessive material between the opposed gore edges. Balloons or articles including such gores are prone to clefting, with the balloon folding in on itself and failing to fully or properly inflate. At high altitudes (where an atmospheric balloon achieves full or near full inflation) the unpredictable profile of a clefted balloon may prevent the desired operation of the balloon or introduce stress risers along the balloon membrane that may cause early failure of the balloon.

In another example, the present subject matter can provide a solution to this problem, such as by using the straight line gore construction. The straight line gore construction described herein with straight line gore edges generated along one or more straight line cutting edges facilitates the consistent generation of gores that properly inflate without clefting. Stated another way, balloons and articles including straight line gores inflate in a consistent fashion and thereby minimize the risk of clefting associated with some balloons (e.g., having constant lobe radius or constant lobe angle gores). Furthermore, the hoop stress experienced by balloons and articles including straight line gores (e.g., gores having straight line edges) is comparable to that of a constant lobe radius or constant lobe angle gore type balloon or article. Accordingly, straight line gores and associated inflatable articles including these gores are less prone to clefting while at the same time providing minimized hoop stress.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
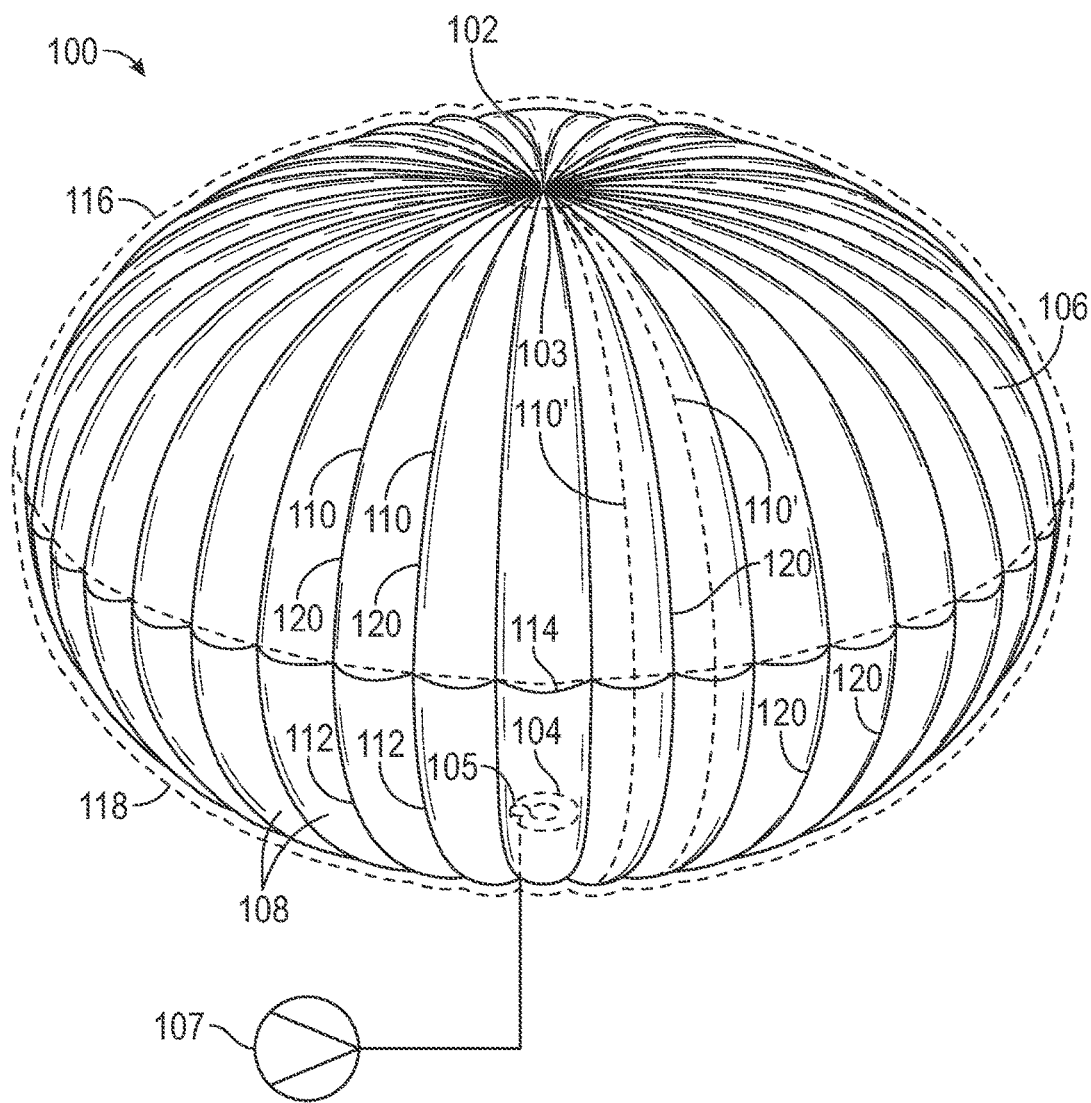
FIG. 1 is a perspective view of one example of an atmospheric balloon.

FIG. 1 shows one example of an article, for instance an inflatable article such as an atmospheric balloon 100. As shown, the atmospheric balloon 100 includes an upper apex 102 and a lower apex 104 (shown in dashed lines) with an equator 114 therebetween. As further shown in FIG. 1 a plurality of gores 108 extend between one or more of the upper apex 102 and the equator 114 or the lower apex 104 and the equator 114. In yet another example the gores 108 extend from the upper apex 102 across the equator 114 to the lower apex 104.

The atmospheric balloon 100 is optionally used in high altitude applications for instance to suspend a payload below the balloon at a desired elevation or range of elevations to facilitate the use of the payload for instance for scientific study, observation, telecommunications, internet access and the like. In one example, the atmospheric balloon 100 includes lobed gores where each of the one or more gores 108 has a lobed configuration thereby providing a component curved profile to each of the gores 108 when the atmospheric balloon 100 is inflated. In one example tendons 120 are provided between each of the gores 108, for instance along seams at the intersections of each of the gores 108. As shown in FIG. 1 in one example, the tendons 120 extend along lines corresponding to the intersections (bonds, joints, seams or the like) between gores extending from the upper apex 102 to the lower apex 104 (and the equator 114 therebetween). Stated another way, the tendons 120 are coincident and overlie the bonded gore edges 110 of the gores as shown at least on the left side of the atmospheric balloon 100 in FIG. 1. Optionally, the tendons 120 are placed along the centerlines of the gores 108. As shown on the other side (right side) of the atmospheric balloon some of the tendons 120 are offset relative to the gore edges 110' and the tendon accordingly extends approximately along the center line of the gore 108 and is remote relative to the gore edges 110'. In another example, the gores 108 are constructed with two mirror image halves joined along a virtual gore centerline (e.g., in the manner of another gore edge 110' that joins the mirror image halves). In such an example, the tendons overlie one or both of the gore edges 110 or 110'.

In another example the atmospheric balloon 100 includes one or more features associated with the balloon 100, for instance one or more of an upper apex fitting 103 (shown in dashed lines) provided at the upper apex 102 or a lower apex fitting provided at the lower apex 104. In one example, the upper apex fitting 103 (or a lower apex fitting) is a structural component provided to facilitate the filling or evacuation of fluids from the atmospheric balloon 100 including one or more of atmospheric gases, lift gases or the like. For instance, in one example the atmospheric balloon 100 includes a ballonet therein configured to receive lift gases to thereby facilitate the ascension and buoyancy of the atmospheric balloon 100. The other chamber of the balloon membrane 106 includes ballast gases, such as atmospheric gases, that are selectively increased or decreased in volume by filling or evacuation at a fitting such as the upper apex fitting 103 at the upper apex 102. By changing the volume of the ballast gas within the atmospheric balloon 100 relative to the lift gas, for instance within a ballonet of the atmospheric balloon 100, changes in elevation of the atmospheric balloon 100 are thereby realized in a controlled and predictable fashion.

In another example one or more fill ports 105 are provided in one or more of the upper or lower apexes 102, 104 for instance at fittings therein. Optionally the fill ports 105 for filling of ballast gas to the atmospheric balloon 100 or lift gas to the atmospheric balloon 100 are provided through one or more fill ports provided for each of the lift gas and ballast gas through the balloon membrane (e.g., through ports in one or more gores 108). A fluid pump 107 is configured to inflate the atmospheric balloon 100.

Referring again to FIG. 1, as previously described herein the atmospheric balloon 100 or another inflatable article (e.g., an inflatable structure, pliable membrane including gores or the like) includes one or more gores such as the gores 108. In contrast to other examples of atmospheric balloons, the atmospheric balloon 100 shown in FIG. 1 includes a plurality of gores 108 constructed with straight line gore edges such as the upper straight line gore edges 110 and lower straight line gore edges 112. As will be described in further detail herein, the straight line gore edges 110, 112 are constructed in a linear pattern without a curve. For instance, the straight line gore edges 110, 112 extend at a constant angle relative to a gore midline extending approximately along the middle of each of the gores 108 for instance from the upper apex 102 to the equator 114 or from the lower apex 104 to the equator 114 (or between the upper and lower apexes 102, 104). That is to say, an angle of the straight line gore edges 110, 112 is substantially consistent from each of the apexes 102, 104 to the equator 114.

The straight line gore edges 110, 112 contrast relative to curved gore edges, for instance used with one or more of constant radius or constant angle gore types, that are used in other examples of atmospheric balloons. The constant radius and constant angle type gores rely on one or more of a constant radius for instance a lobe radius of the gores between the upper and lower apexes 102, 104 to the equator 114 or a constant angle of the lobe from the upper and lower apexes 102, 104 to the equator 114 to generate the lobed configuration shown for instance in a pumpkin balloon (similar to that shown in FIG. 1). The constant radius and constant angle type gores are generated with precise, mathematically predetermined curves to accordingly generate the gores 108 with precise curved edges that are then joined along the edges to form the corresponding balloon. As will be described herein, the precise mathematical curves used to generate each of the gores are not easily scaled and are instead determined according to the desired dimensions of the balloon as well as the number of gores used in the balloon (each of which may vary with differences in balloon size).

In contrast to the curved gore edges, including constant radius and constant angle constructions, the gores 108 shown in FIG. 1 of the atmospheric balloon 100 include straight line edges such as the upper and lower straight line gore edges 110, 112. As will be described and shown herein the straight line gore edges 110, 112 are straight lines (have straight line edges) extending from the upper apex 102 and lower apex 104 of each of the gores 108 to the equator 114. The upper and lower straight line gore edges 110, 112 when used with the gores 108 are easily scaled with changes in balloon dimensions (increasing or decreasing balloon diameter, balloon height and corresponding increasing or decreasing in the total number of gores 108). Stated another way, because each of the gores 108 includes straight lines that are formed at a consistent angle, the templates used for the straight line gores are thereby easily scaled to facilitate the generation of larger and smaller atmospheric balloons 100 with minimal mathematical recalculation and corresponding generation of updated templates. The templates of a larger or smaller balloon continue to include straight line edges extending along or at a desired constant angle (e.g., relative to midlines of each of the gores 108).

Additionally, and as described further herein, the gores 108 including upper and lower straight line gore edges 110, 112 readily facilitate the inflation of the atmospheric balloon 100 at high altitudes with minimal to no clefting of the atmospheric balloon 100. That is to say, inflation of the atmospheric balloon 100 at altitude occurs in a consistent and predictable fashion without clefting otherwise found with atmospheric balloons generated with poorly modeled (curved) templates and corresponding poorly modeled curved edges.

Figure 2A:
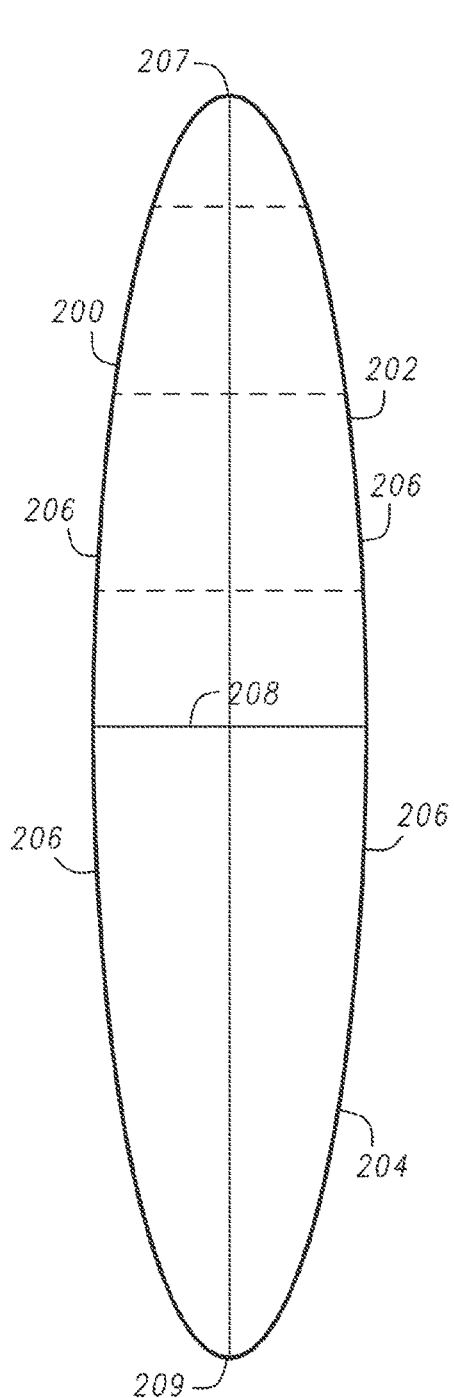
FIG. 2A is a top view of one example of a component gore formed according to a constant lobe radius.

FIG. 2A shows one example of a constant radius gore 200. As previously described herein a constant radius gore is one example of a gore used in atmospheric balloons to generate a lobed pumpkin shape. The constant radius gore 200 includes gore edges 206 having a curved pattern (exaggerated in the view shown in FIG. 2A) to correspondingly provide a constant radius of the gore 200 from at least its upper apex 207 to its equator 208 and from its lower apex 209 to the equator 208 (see FIG. 2B for cross sections at various locations corresponding to the dashed lines in FIG. 2A). That is to say, the constant radius gore 200 has curved gore edges 206 along each side of the gore 200 and accordingly as a balloon including the gore 200 is inflated the surface of the gore (e.g., a component part of the balloon membrane) has a constant radius as shown in the cross-sectional plots of FIG. 2B. The dashed lines provided at three locations along the constant radius gore 200 provide indexed locations for each of the cross-sections shown in FIG. 2B. Referring again to FIG. 2A, in one example the constant radius gore 200 includes upper and lower gore portions 202, 204. The gore edges 206 for instance at the left and right side of the constant radius gore 200 are substantially duplicated between the equator 208 and the upper apex 207 and the equator 208 and the lower apex 209.

Figure 2B:
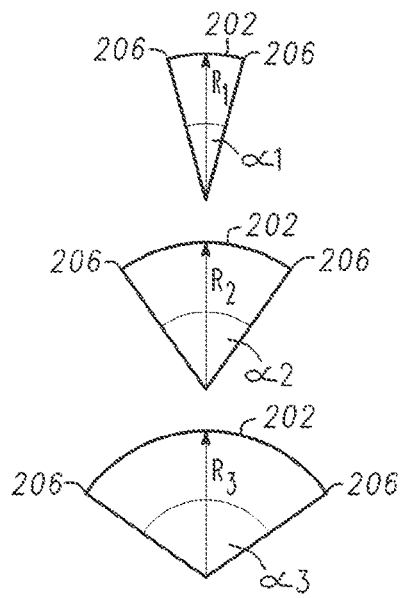
FIG. 2B is a series of cross sections of the component gore having the constant lobe radius of FIG. 2A.

As previously described herein the gore edges 206 to generate the constant radius profile shown in the cross-sections of FIG. 2B are provided based on mathematically determined curved templates. The material of the balloon membrane is cut along the mathematically determined template to provide an accurate representation of the curve along the gore edge 206. Where the mathematical curve is accurately determined and plotted on the template and the gore edge 206 is thereafter accurately cut along the curve the atmospheric balloon including a plurality of the constant radius gores 200 consistently inflates without clefting under ideal circumstances. As also previously described the mathematical curve used to generate the gore edges 206 shown for instance in FIG. 2A is not easily scaled for instance for larger and smaller atmospheric balloons including a differing number of gores and differing size characteristics for the balloons (width, height or the like). The mathematical curves are accordingly recalculated and then plotted along a template to ensure corresponding gore edges such as the gore edges 206 of larger or smaller balloons are accurately cut into the balloon membrane material to thereby generate constant radius gores 200 that facilitate the consistent and reliable inflation of a corresponding balloon including the larger or smaller constant radius gores 200 depending on the balloon in question.

Referring again to FIG. 2B, three consecutive cross-sections of the upper gore portion 202 of the constant radius gore 200 are provided. As shown by the caption above the cross-sections the radius ($R_1$, $R_2$, $R_3$) is identical between each of the cross-sections. That is to say, the lobe radius of the constant radius gore 200 (e.g., when the corresponding atmospheric balloon is inflated) is constant from at least the apex (e.g., the upper or lower apexes 207, 209) to the equator 208. In contrast, the angle of the constant radius gore 200, for instance $\alpha_1$, $\alpha_2$, $\alpha_3$, changes between the upper and lower apexes 207, 208 as the cross-sections progress toward the equator 208. For instance, as shown in FIG. 2B the angles $\alpha_1$, $\alpha_2$, $\alpha_3$ increase in each of the cross-sections from the upper apex 207 toward the equator 208. Accordingly, as shown in the progressive cross-sections in FIG. 2B the corresponding profile of the constant radius gore 200 provides a more humped or lobed configuration as the constant radius gore 200 extends from the upper apex 207 to the equator 208 and similarly from the lower apex 209 to the equator 208. That is say, the lobe of the constant radius gore 200 becomes more pronounced closer to the equator 208 relative to the upper or lower apexes 207, 209.

As previously described herein, in some examples where the mathematical formula and corresponding curve used to generate a cutting template are not entirely accurate (e.g., improperly scaled) the resulting gore and gore edges 206 provide a more or less pronounced lobed profile than the ideal shape. In some circumstances the corresponding atmospheric balloon clefts because of the inaccurate lobed profile at one or more of the gores and thereby fails to sufficiently inflate or inflate properly and frustrates the desired operation of the atmospheric balloon (e.g., frustrates maintenance of the balloon at the desired altitude, fails to suspend payload, frustrates elevation changes of the balloon or interferes with the planned descent and recovery of the balloon or the like).

Figure 3A:
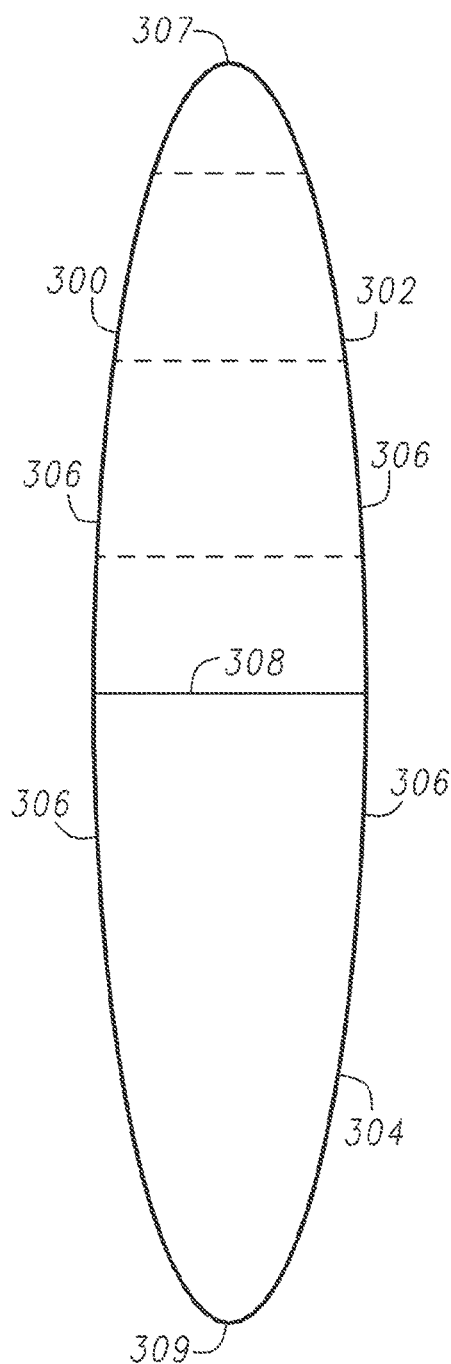
FIG. 3A is a top view of another example of a component gore formed according to a constant lobe angle.

FIG. 3A shows one example of a constant angle gore 300 (a constant lobe angle gore). As shown the constant angle gore 300 includes an upper and lower gore portion 302, 304. The upper gore portion 302 extends from an upper apex 307 to the equator 308 while the lower gore portion 304 extends from the lower apex 309 to the equator 308. In a similar manner to the constant radius gore 200 shown in FIG. 2A, the constant angle gore 300 shown in FIG. 3A includes curved gore edges 306. The curves of the gore edges 306 are exaggerated in the plot shown in FIG. 3A to illustrate the curved character cut into balloon membrane material when forming the constant angle gore 300.

Figure 3B:
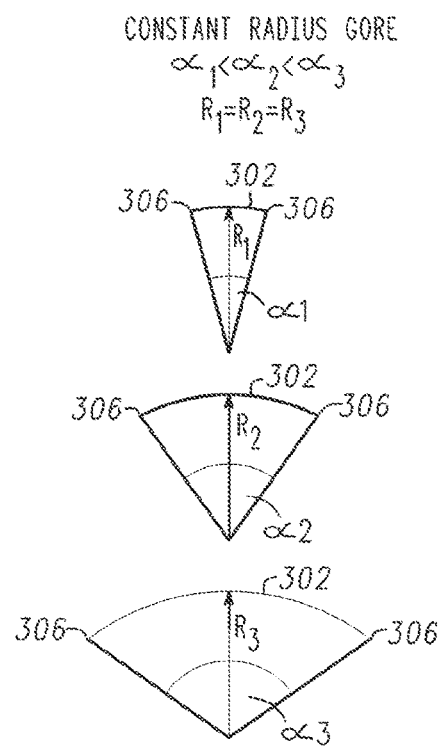
FIG. 3B is a series of cross sections of the component gore having the constant lobe angle of FIG. 3A.

As previously described herein, the gore edges 306 are cut into the balloon membrane material to form the constant angle gore 300 by plotting mathematically predetermined curves along a template and then cutting the balloon membrane material along the mathematical curve of the template. The constant angle gore 300 with the curved gore edges 306 as part of a balloon generates the lobed profile (FIG. 3B) with inflation of the balloon. As with the example shown in FIG. 2A, the cross-sections provided in FIG. 3B are indexed to the dashed lines extending across three portions of the upper gore portion 302 progressing from the upper apex 307 toward the equator 308. The lower portion 304 of the constant angle gore 300 also includes similar profiles to those shown in FIG. 3B.

In contrast to the profile shown for instance in FIG. 2B, the profile provided in FIG. 3B is a constant lobe angle gore profile illustrated at three locations along the constant angle gore 300. As shown the constant angle gore 300 has a lobed configuration that changes in profile from near the upper apex 307 where it is most pronounced (appears as a larger hump) to the equator 308 where it is least pronounced (has smaller overall profile). As shown in each of the cross-sections provided in FIG. 3B the constant angle gore 300 has a plurality of angles measured between the gore edges 306 where each of the gore angles corresponding to identical measurements (e.g., $\alpha_1$, $\alpha_2$ and $\alpha_3$). As shown in FIG. 3B the angles $\alpha_{1-3}$ are constant between the upper apex 307 and the equator 308 (similarly between the lower apex 309 and the equator 308).

In contrast to the constant angles of the gore 300 the radius of the gore 300 changes between the upper apex and the equator 308. For instance, as shown in FIG. 3B the topmost cross-section includes the smallest of the measured radii ($R_1$) while the middle cross-section includes the second largest radius ($R_2$) and the third cross-section includes the largest radius ($R_3$). As shown in FIG. 3B the radii of the constant angle gore 300 increases from the upper apex 307 to the equator 308 and in combination with the constant angle ($\alpha_{1-3}$) generates a gradually flatter profile from the upper apex 307 to the equator 308. That is to say the profile of the constant angle gore 300, for instance near to the upper apex 307, is more pronounced (is more lobed or humped) relative to the profile of the constant angle gore 300 near the equator 308.

As previously described with regard to the constant radius gore 200, here again where the mathematical formula, corresponding templates and cutting of the constant angle gore 300 to form the gore edges 306 is done accurately the lobed profile of the constant angle gore 300 allows the corresponding atmospheric balloon to consistently inflate to a full inflated configuration. However, where one or more of the mathematical formula, corresponding template or cutting of the constant angle gore 300 are done improperly or with some error the risk of clefting of the balloon with constant angle gores 300 increases. Further, with either of the constant radius gore 200 or the constant angle gore 300 each of the gores 200, 300 (and templates for the same) are not easily scaled. That is to say, the mathematical formula and corresponding templates based on the mathematical formula (e.g., including curves based on the dimensions of the balloon, number of gores and the like) are necessarily recalculated and plotted again as balloons and their associated gores are scaled larger or smaller relative to the gores shown, for instance in FIGS. 2A and 3A. That is to say the mathematical formula and corresponding templates are generated again for variations in size of an atmospheric balloon to account for changes in the number of gores, changes in dimensions of the balloon or the like. Stated another way, simply resizing the curves and the corresponding curves on the templates does not necessarily provide for constant radius or constant angle gores 200, 300 that will facilitate reliable inflation (e.g., without clefting) in larger or smaller balloons.

Figure 4A:
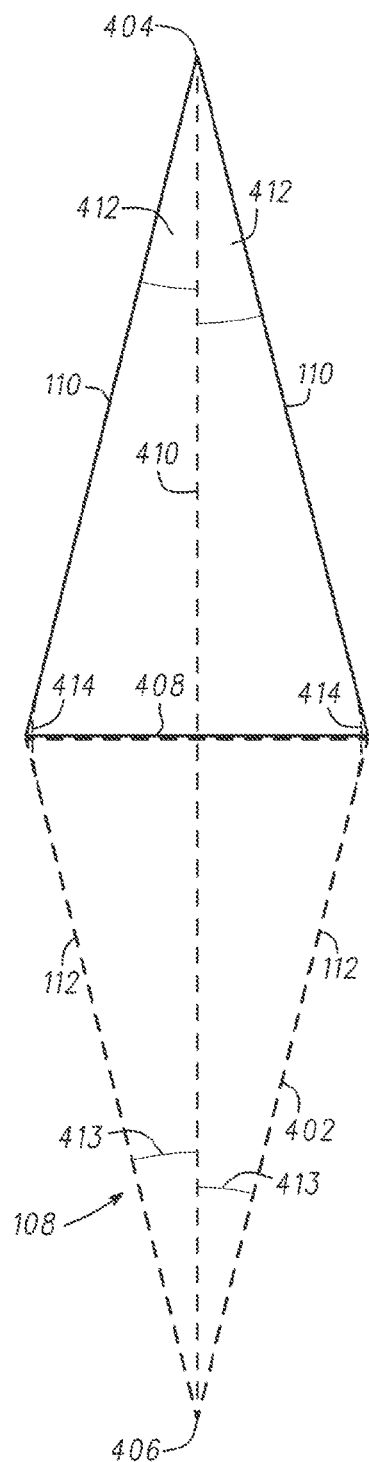
FIG. 4A is a top view of another example of a straight line component gore.

FIG. 4A shows one example of gore 108 used in the atmospheric balloon 100 previously shown in FIG. 1. As shown in FIG. 4A, the gore 108 is a straight line gore having a diamond shape or diamond profile when extending across an equator, such as the gore equator 408. In another example, the gore 108 has a triangular pattern and is assembled with an identical gore for instance another triangular gore (corresponding to a lower gore portion 402) to thereby form a composite gore as shown in FIG. 4A (by the lower gore portion in dashed lines). That is to say, any of the gores described or claimed herein include one or more of a full gore having a diamond shape shown in FIG. 4A as well as a partial triangular shape including one or more of the upper or lower gore portions 400, 402 also shown in FIG. 4A.

Referring again to FIG. 4A, as shown the upper gore portion 400 includes the upper straight line gore edges 110 extending from an upper gore apex 404 (corresponding to or adjacent to the upper apex 102 of the atmospheric balloon 100) to the gore equator 408 (corresponding to the equator 114). Similarly, the lower gore portion 402 includes lower straight line gore edges 112 extending from the lower gore apex 406 (adjacent to or corresponding to the lower apex 104 shown in FIG. 1) to the gore equator 408. As previously described herein, the straight line gore edges 110, 112 have a substantially straight character relative to the curved edges used for instance with the constant radius gore 200 (FIG. 2A) and the constant angle gore 300 (FIG. 3A). Accordingly, the component gore 108 has a substantially diamond or triangular shape depending on the gore composition (one or more of upper and lower gore portions 400, 402) as shown for instance in FIG. 4A.

Each of the upper straight line gore edges 110 and lower straight line gore edges 112 extend, in one example, relative to a gore midline 410 at angles such as the upper angles 412 and lower angles 413. The upper and lower straight line gore edges 110, 112 consistently extend according to the angles between the respective upper and lower gore apexes 404, 406 and the gore equator 408 to thereby have a straight linear profile from each of the apexes 404, 406 to the gore equator 408. In another example, the upper and lower straight line gore edges 110, 112 include gore fillets 414 shown for instance in FIG. 4A. The template for the gore fillets 414 is provided as part of the cutting template for the gore 108 to facilitate the transition of a cutting tool between each of the upper and lower gore portions 400, 402 (e.g., without a sharp corner at the equator 408). In another example, the upper gore apex 404 and the lower gore apex 406 have a corresponding fillet or other rounded feature to thereby facilitate the cutting of the gore 108 at each of the upper and lower gore apexes 404, 406.

Figure 4B:
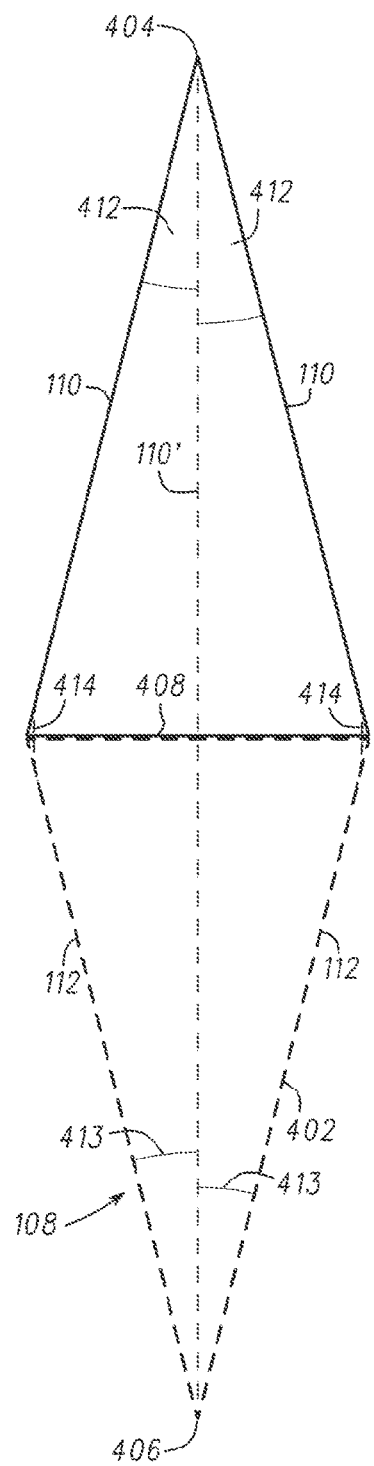
FIG. 4B is a top view of still another example of a straight line component gore including mirror image sides.

Referring to now to FIG. 4B, in this example each of the straight line gore edges 110 extends at a consistent angle relative to the gore midline 410, for instance at angles such as the upper angles 412 and lower angles 413 previously discussed herein. Accordingly, the straight line gore edges 110 extend along the angles between the respective upper and lower gore apexes 404, 406 and have a straight linear profile from each of the apexes 404, 406. In another example shown in FIG. 4B, gore edges 110' (e.g., centerline gore edges) are provided between mirror image gores (e.g., two triangular shaped gores). The mirror image gores are joined with each other along the gore edges 110' and joined with adjacent gores 108, for instance along the straight line gore edges 110, 112. In another example, the gore 108 include gore fillets 414 between the straight line gore edges 110, 112, as shown in FIG. 4B. Optionally. the template for the gore fillets 414 is provided as part of the cutting template for the gore 108 to facilitate the transition of a cutting tool (e.g., without a sharp corner at the equator 408). In another example, one or more of the upper gore apex 404 and the lower gore apex 406 have a corresponding fillet (similar to the gore fillets 414) to facilitate the cutting of the gore 108 at each of the upper and lower gore apexes 404, 406.

As previously described the gore 108 shown in FIGS. 4A, B has a plurality of straight line gore edges, such as the upper straight line gore edges 110 and the lower straight line gore edges 112. These straight line gore edges and the corresponding gore 108 differ from the previously described gores (the constant radius gore 200 and the constant angle gore 300). Referring back to FIGS. 2A and 3A the respective constant radius gore 200 and constant angle gore 300 have curved edges to facilitate the lobing of the gore material in an inflated configuration for instance where the gores 200, 300 are incorporated as part of an atmospheric balloon. The lobe profiles are shown in FIGS. 2B and 3B and are generated by one or more of a constant radius in the case of FIG. 2B or constant angle in the case of FIG. 3B. In contrast to these designs the gores 108 shown in FIGS. 4A, B and included in the atmospheric balloon 100 shown in FIG. 1 includes the upper and lower straight line gore edges 110, 112 that also facilitate the lobed profile shown in FIG. 1.

When a plurality of gores 108 are assembled into an article, for instance an inflatable article such as a structure or atmospheric balloon 100, the gores 108 with the upper and lower straight line gore edges 110, 112 inflate into a lobe profile as shown in FIG. 1. With the straight line gore edges 110, 112 and corresponding gores 108 including the same an atmospheric balloon 100 or other inflatable article is able to consistently inflate into a deployed condition such as that shown in FIG. 1 (a fully inflated configuration) with minimal clefting of the atmospheric balloon 100. Further the pattern, such as a template, used to form the straight line gore 108 is easily scaled to readily generate larger and smaller balloons or other articles (inflatable or non-inflating). That is to say, by scaling a particular template (e.g., scaling the cut lines for the template based on the desired length and angle for the straight line gore edges 110, 112) a technician is readily able to generate gores 108 having larger or smaller sizes while at the same time providing a gore construction that (when assembled) is part of an atmospheric balloon 100 the consistently inflates without clefting. Stated another way, complex recalculation and plotting of mathematically generated curves for a cutting template are avoided. Instead, the upper and lower straight line gore edges 110, 112 are readily scaled up or down (for instance with a fabrication assembly as described herein) to generate a plurality of gores 108 having varying sizes and configurations (variations in upper and lower angles 412, 413 and lengths of the upper and lower straight line gore edges 110, 112) for a variety of different articles.

Figure 5A:
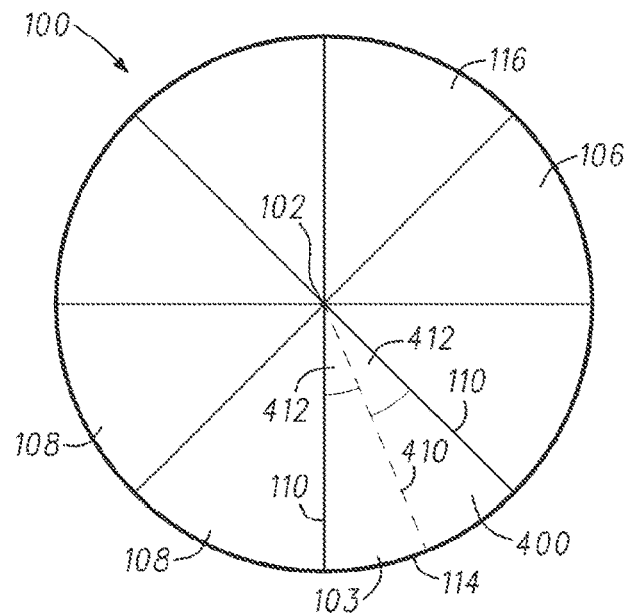
FIG. 5A is a top view of one example of an inflatable article in a deflated configuration including straight line component gores.

FIG. 5A shows one example of the atmospheric balloon 100 (previously shown in FIG. 1) in a spread deflated configuration. In the spread deflated configuration the atmospheric balloon 100 is shown with the upper disk panel 116 in a spread outwardly from the upper apex 102 with the lower disk panel 118 provided below the upper disk panel 116 (and concealed in this view).

As shown in FIG. 5A the upper disk panel 116 in the spread deflated configuration includes a plurality of gores 108 extending from the upper apex 102 to the equator 114 of the atmospheric balloon 100. As shown and as previously described herein, each of the gores 108 has upper straight line gore edges 110 (as well as lower straight line gore edges 112). The upper straight line gore edges 110 in this example extend from the upper apex 102 along straight lines to the equator 114 of the atmospheric balloon 100. That is to say, the balloon membrane 106 including for instance the upper disk panel 116 is constructed with a plurality of gores 108 where each of the gores have upper straight line gore edges 110 that when arranged on a flat surface (e.g., an assembly table) or prior to inflation have the straight line pattern as shown for instance in FIG. 5A. The upper straight line gore edges 110 (and the lower straight line gore edges 112) facilitate alignment of the gore edges and corresponding joining, for instance with one or more of adhesives, heat seals, stitching, taping or the like, along the gore edges.

Referring again to FIG. 5A, the upper straight line gore edges 110 in one example extend relative to a gore midline 410 of a component gore 108 along dual upper angles 412. As shown in FIGS. 4A, B and shown again in FIG. 5A, the upper angles 412 in one example extend between each of the upper straight line gore edges 110 and the gore midline 410. Because the upper straight line gore edges 110 are straight cut along the upper angle 412 (and the lower straight line gore edges 112 are cut along the lower angles 413) the edges extend in a straight linear fashion substantially from the upper apex 102 to the equator 114. Accordingly in the spread deflated configuration shown in FIG. 5A each of the gores 108 of the upper disk panel 116 are provided in a relaxed (uninflated configuration) the with each of the upper straight line gore edges 110 arranged in a substantially linear or pie shaped configuration from the upper apex 102 to the equator 114.

Figure 5B:
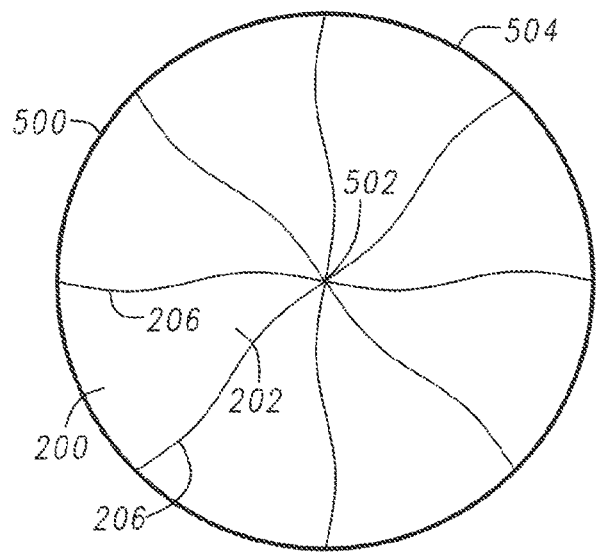
FIG. 5B is a top view of another example of an inflatable article in a deflated configuration including curved line component gores.

Referring now to FIG. 5B, another example of an atmospheric balloon 500 is shown where the component gores, for instance a constant radius gore 200 or constant angle gore 300, are assembled together to form the balloon membrane. As shown, the atmospheric balloon 500 when in a spread deflated configuration as shown in FIG. 5B has nonlinear gore edges 206 extending from the upper apex 502 of the atmospheric balloon 500 to the equator 504. Because of the curved gore edges 206 (or curved gore edges 306 shown in FIG. 3A) when spread flat the gore edges 206 assume a nonlinear (rumpled) orientation. That is to say, in the spread deflated configuration shown in FIG. 5B the atmospheric balloon 500 has a plurality of constant radius gores 200 (or constant angle gores 300) with corresponding edges that have a non-straight line orientation relative to that shown in FIG. 5A. The curved gore edges 206 and the related non-linear orientation of the gore edges 206 in some examples frustrate alignment and joining of the gores.

Figure 6:
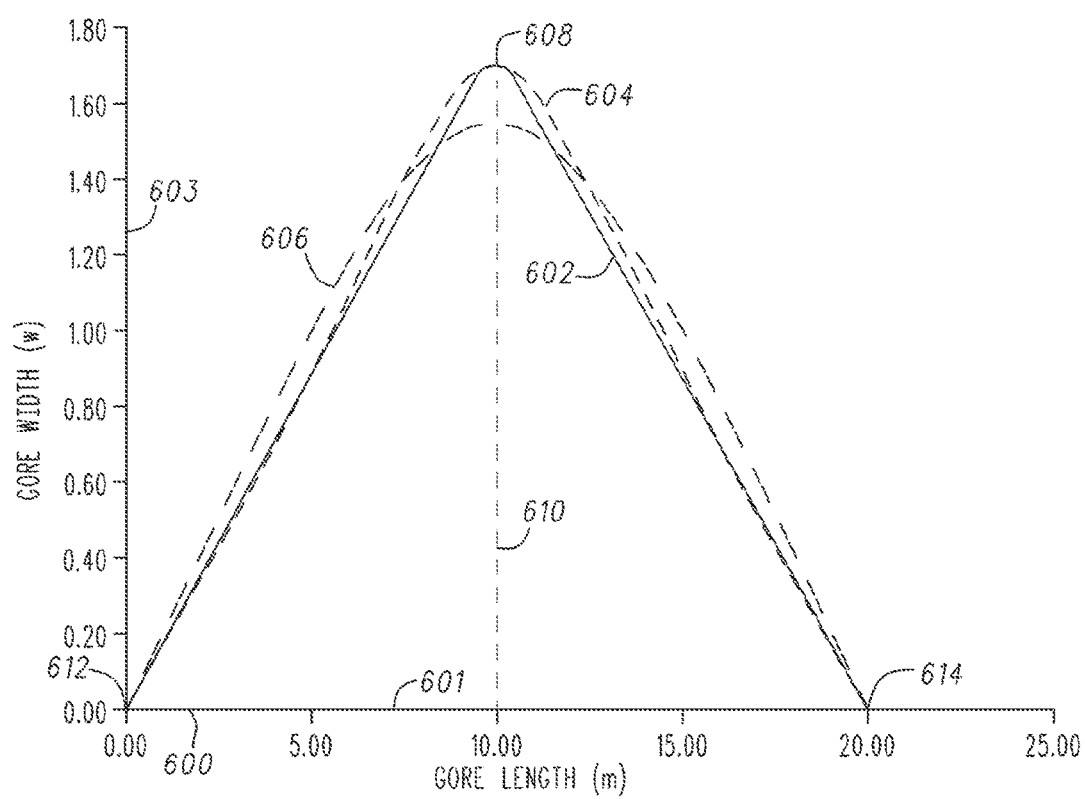
FIG. 6 is an exemplary plot showing comparative examples of component gores.

FIG. 6 shows a gore profile plot 600 with a variety of varying gore profiles, for instance a straight line gore profile 602, a constant radius gore profile 604 and a constant angle gore profile 606. The gore profile plot 600 shows half of each of the corresponding gores for instance the gores 108, 206 and 306 shown in FIGS. 4, 2A, 3A. Each of the gores extends from an upper apex 612 and a lower apex 614 to the equator 610. The exemplary straight line gore profile 602 includes straight line gore edges as previously described herein extending as straight lines from the upper apex 212 toward the equator 610 and similarly extending in a straight line from the lower apex 614 toward the equator 610. In one example the straight line gore profile 602 includes a gore fillet 608 similar to the gore fillet 414 shown in FIGS. 4A, B. That is to say, the straight line gore profile 602 including a template for cutting the same has a curved corner such as the gore fillet 608 to facilitate the cutting of the gore edges of the straight line gore profile 602 at an interface between the edges (e.g., at the equator 610).

In contrast to the straight line gore profile 602 each of the constant radius gore profile 604 and the constant angle gore profile 606 have gore edges having a curving character as previously shown in FIGS. 2A, 3A. For instance, the constant radius gore profile 604 shown in FIG. 6 and shown again in FIGS. 2A, B has a constant radius from its upper apex 207 to the equator 208 as shown in FIG. 2A. The resulting lobed configuration or profile of the constant radius gore corresponding to the constant radius gore profile 604 shown in FIG. 6 has a profile as shown in FIG. 2B with the radius remaining unchanged between each of the respective sections of the constant radius gore while the angles between each of the sections for instance along the edges 206 shown in FIGS. 2A and 2B vary.

Similarly, FIG. 6 also shows a constant angle gore profile 606 The constant angle gore 300 is also shown in FIGS. 3A and 3B and has curved gore edges 306 that extend between an upper apex 307 and an equator 308 as shown in FIG. 3A and corresponding to the upper apex 612 and equator 610 (as well as the lower apex 614 in the case of the lower apex 309) of FIG. 6. The curved configuration of the gore edges 306 provide the lobed profile shown in FIG. 3B. The angle measured between the edges 306 of the constant angle gore 300 is substantially constant between the upper apex and the equator 308 corresponding to the upper apex 612 and equator 610 shown for instance in FIG. 6 while the radii measured from the foci of the measured angles in FIG. 3B change. That is to say, the radius increases from the upper apex 307 toward the equator 308 and similarly increases from the corresponding upper apex 612 to the equator 610 shown for instance in FIG. 6.

As previously described herein the straight line gore profile 602 shown in FIG. 6 and shown again by way of the gores 108 (e.g., a diamond shape) in FIGS. 4A, B has substantially straight lines corresponding to the upper and lower straight line gore edges 110, 112 also shown in FIGS. 4A, B. A gore 108 having the configuration in FIGS. 4A, B (and the corresponding configuration shown by way of the gore profile 602 in FIG. 6), when assembled into an atmospheric balloon 100, inflates into a substantially lobed shaped pumpkin balloon as shown in FIG. 1 while at the same time minimizing hoop stress throughout the atmospheric balloon 100 or corresponding article including the same. Further, clefting and other phenomena associated with poorly modeled gores (e.g., having variations in the desired curved gore edges with constant radius and constant angle gores) are thereby avoided. Instead, the straight line gore edges such as the upper and lower straight line gore edges 110, 112 facilitate the ready inflation of the atmospheric balloon 100 or other corresponding article into an inflated condition with substantially no clefting (including a minimized amount of clefting relative to other balloon examples).

Furthermore the gores 108 shown in FIGS. 4A, B and corresponding to the straight line gore profile 602 shown in FIG. 6 results in substantial material savings relative to the other gore profiles including for instance the constant radius gore profile 604 and constant angle gore profile 606 shown in FIG. 6. That is to say, the straight line gore profile 602 uses straight lines extending between the upper and lower apexes 612 to the equator 610 and substantial material savings are realized relative to other curved gore profiles. The outlying edges of the other curved gore profiles such as the constant radius gore profile 604 and constant angle gore profile 606 extend in a curved fashion. The curved edges for each of the gore profiles 604, 606 covers a larger overall area and correspondingly requires more material than a similarly dimensioned straight line gore profile 602. That is to say, balloons or articles using gores, such as the gore 108, use substantially less balloon membrane 106 (as shown in FIG. 1) relative to balloons incorporating either of the constant radius or constant angle gores 200, 300. Stated another way an atmospheric balloon 100 as shown in FIG. 1 is able to generate a balloon of a desired shape and size with a desired number of gores that uses less material while inflating in a consistent and predictable fashion relative to other balloons using constant angle or constant radius gores such as the gores 200, 300 shown FIGS. 2A, 3A.

Figure 7:
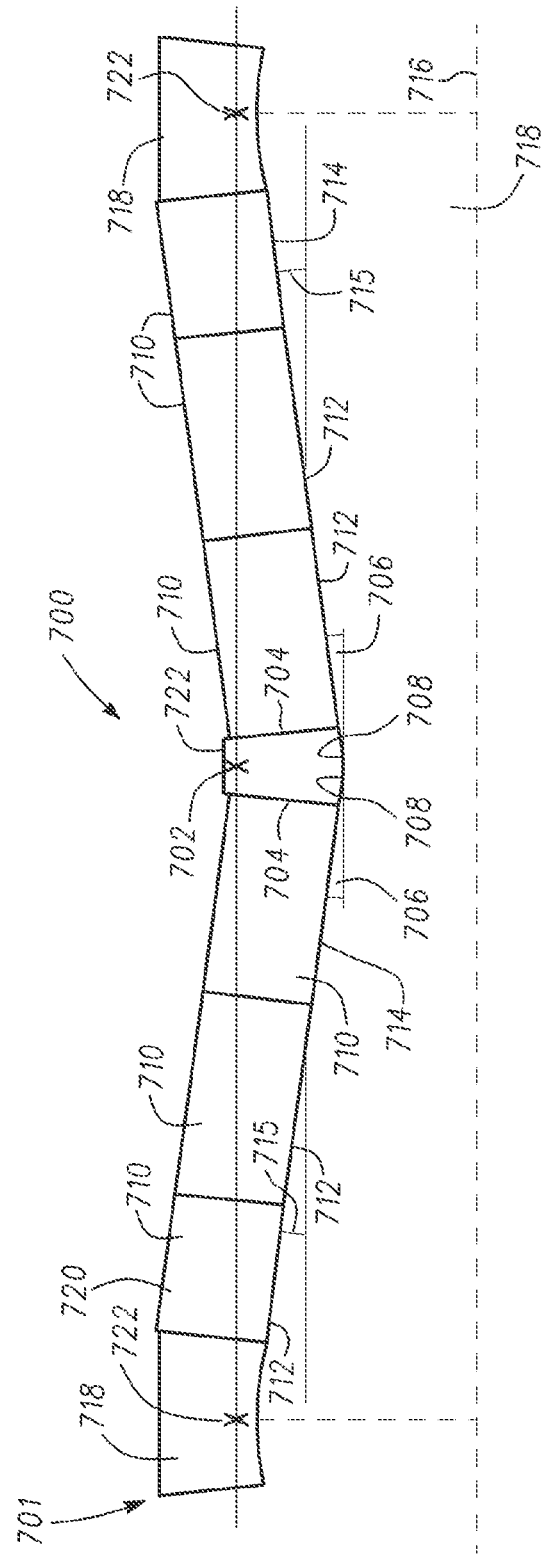
FIG. 7 is a schematic view showing one example of a straight line gore and article fabrication system.

FIG. 7 shows a schematic example of one example of a fabrication assembly 700 (as part of a fabrication system 701) with a plurality of components provided in the manner of a kit. The fabrication assembly 700 is in one example used to construct one or more gores such as the gores 108 shown for instance in FIGS. 4A, B. As previously described herein, the gore 108 (each of the gores 108 shown in FIGS. 4A, B)

has a plurality of straight line gore edges, such as the upper and lower straight line gore edges 110, 112. The fabrication assembly 700 is configured to provide one or more cutting edges (e.g., a composite straight line cutting edge 714) by way of multiple components to accordingly provide the desired straight line gore edges of the gore 108. Further, as previously described herein the gores 108 with the upper and lower straight line gore edges 110, 112 or a gore having a plurality of straight line gore edges (e.g., gores for use with inflatable articles including but not limited to but balloons, inflatable structures and the like) are easily scaled through expansion or contraction of the composite straight line cutting edge 714 used to cut the gores 108. The fabrication assembly 700 provides a readily scaled system that allows for the increasing or decreasing of gore sizes and changing of upper and lower angles 412, 413 (FIGS. 4A, B) according to the specifications for a particular gore 108 having straight line gore edges.

Referring again to FIG. 7 the fabrication assembly 700, when in the assembled configuration shown, provides a fabrication surface 720 including a plurality of components assembled in an end-to-end fashion that are coupled together and provide a cutting template or composite straight line cutting edge 714 to facilitate the cutting of balloon membrane materials 716.

In the example shown the fabrication assembly 700 includes at least one keystone segment 702 provided between portions of the fabrication assembly 700 corresponding to cutting edges for the upper straight line gore edges 110 and lower straight line gore edges 112 described herein. As shown in FIG. 7 the keystone segment 702 includes an interface 704. The interface 704 in one example provides the interface to other segments, such as one or more cutting edge segments 710 and intermediate segments 718. The keystone segment 702 in one example specifies the angle of the gore 108. That is to say, an interface angle 706 of the keystone segment 702 positions the interface 704 at a desired angle to accordingly orient each of the cutting edge segments 710 and intermediate segments 718 described herein to form the template for cutting of the gore 108. As shown in the example in FIG. 7 the keystone segment 702 includes two interface angles 706 provided on the left and right sides of the keystone segment 702. The interface angle 706 is in one example drawn relative to the horizontal and accordingly orients the interface 704 (at right angles to the interface angle 706) to the position shown.

In another example, the keystone segment 702 includes one or more cutting edges 708 configured to provide one or more cutting edges configured to provide either of straight cutting edges, curved cutting edges or both styles of cutting edges to a corresponding gore fabricated on the fabrication assembly 700. For instance, in one example the desired gore is formed from the balloon membrane material 716 and includes a gore fillet, such as the gore fillet 414 shown for instance in FIGS. 4A, B. The keystone segment 702 including the keystone cutting edge 708 includes a cutting edge having an optional curved cutting edge 708 configured to provide the template for the gore fillet 414.

As further shown in FIG. 7 the fabrication assembly 700 includes one or more cutting edge segments 710 provided in an end-to-end arrangement wherein the cutting edge segments 710 extend from the keystone segment 702 along a cutting edge angle 715 according to the interface 704 positioned at an angle based on the interface angle 706. Each of the cutting edge segments 710 include a component cutting edge 712 extending away from the keystone cutting edge 708. As shown the cutting edge segments 710 as well as the component cutting edges 712 are oriented relative to the keystone segment 702 according to the interface angle 706 and interface 704. Accordingly, the component cutting edge 712 as well as the keystone cutting edge 708 form a composite straight line cutting edge 714 extending away from the keystone segment 702 to thereby provide the desired profile of the gore, such as the gore 108. For instance, as shown in FIG. 7 the composite straight line cutting edge 714 extends to the left and right of the keystone segment 702 and cutting of the balloon membrane material 716 along the edge 714 accordingly provides one or more of each of the upper straight line gore edges 110 and lower straight line gore edges 112. Stated another way, the cutting edge angles 715 of the component cutting edges 712 and the composite straight line cutting edge 714 are based on the interface angle 706 of the keystone segment 702 and thereby generate the upper and lower straight line gore edges 110, 112 at the specified angles for the gore edges.

As further shown in FIG. 7, in one example the fabrication assembly 700 includes one or more intermediate segments 718 provided at the ends of the cutting edge segments 710. The intermediate segments 718 have a staggered or corresponding configuration to an exterior edge of the keystone segment 702 (e.g., corresponding to the keystone cutting edge 708).

Figure 9:
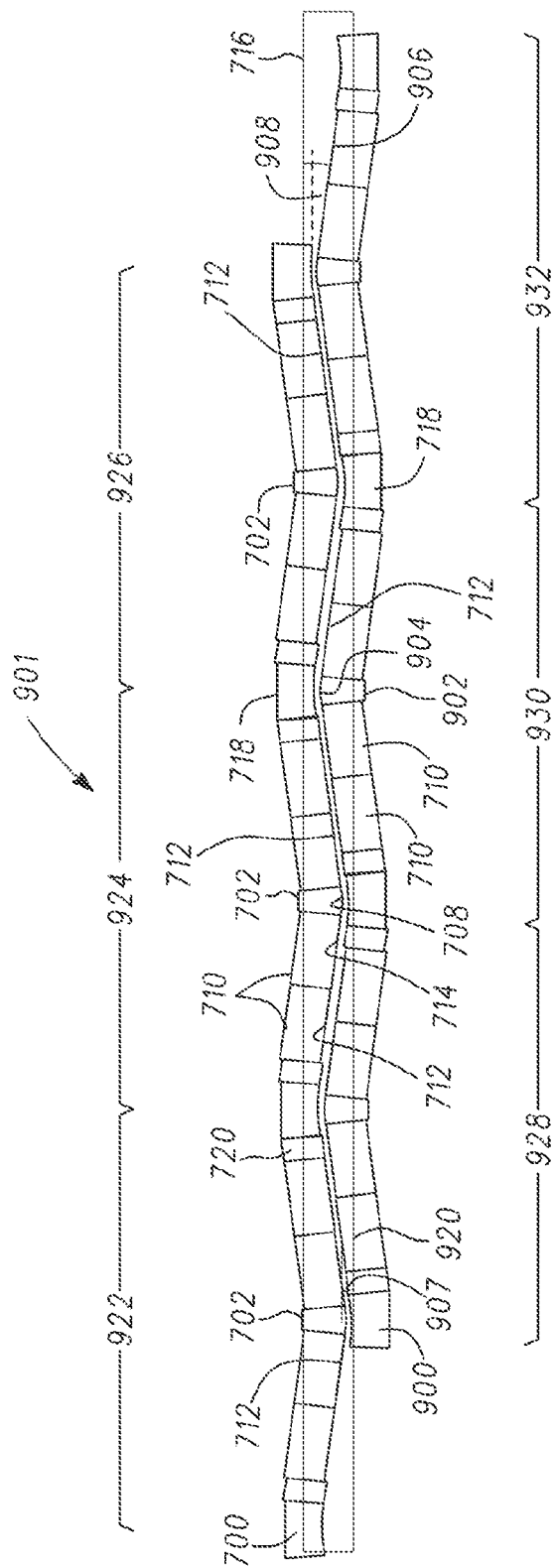
FIG. 9 is a schematic view showing another example of a straight line gore and article fabrication system including complementary fabrication assemblies having a shared straight line cutting edge.

As will be described herein in one example the interior corner of the intermediate segment 718 mates with the corresponding keystone cutting edge 708 of a second fabrication assembly 700 coupled in a complementary configuration with the fabrication assembly 700. One example of such configuration is shown in FIG. 9 and will be described further herein.

Further, in another example the intermediate segment 718 provides an interface between additional cutting edge segments 710 for instance for use with additional stations for cutting additional gores to thereby provide for the fabrication of multiple gores in an inline fashion. For instance, the fabrication assembly 700 shown in FIG. 7 extends to the left or right (off of the page) and accordingly includes cutting edge segments 710 extending from each of the intermediate segments 718 in an orientation prescribed by the angles of the intermediate segment 718 faces. That is to say in one example the fabrication assembly 700 includes a duplicate series of cutting edge segments 710 and keystone segments 702 extending away from each of the intermediate segments 718. In this manner, the balloon membrane material 716 may be placed on the fabrication surface 720 of the fabrication assembly 700 in a lineal fashion (e.g., unrolled from a spindle) and gores are then cut at each of a plurality of stations along the fabrication assembly 700. FIG. 9 shows one example of a fabrication assembly 700 as well as a second fabrication assembly 900 having a plurality of fabrication stations along each of the fabrication assemblies 700, 900.

Figure 8:
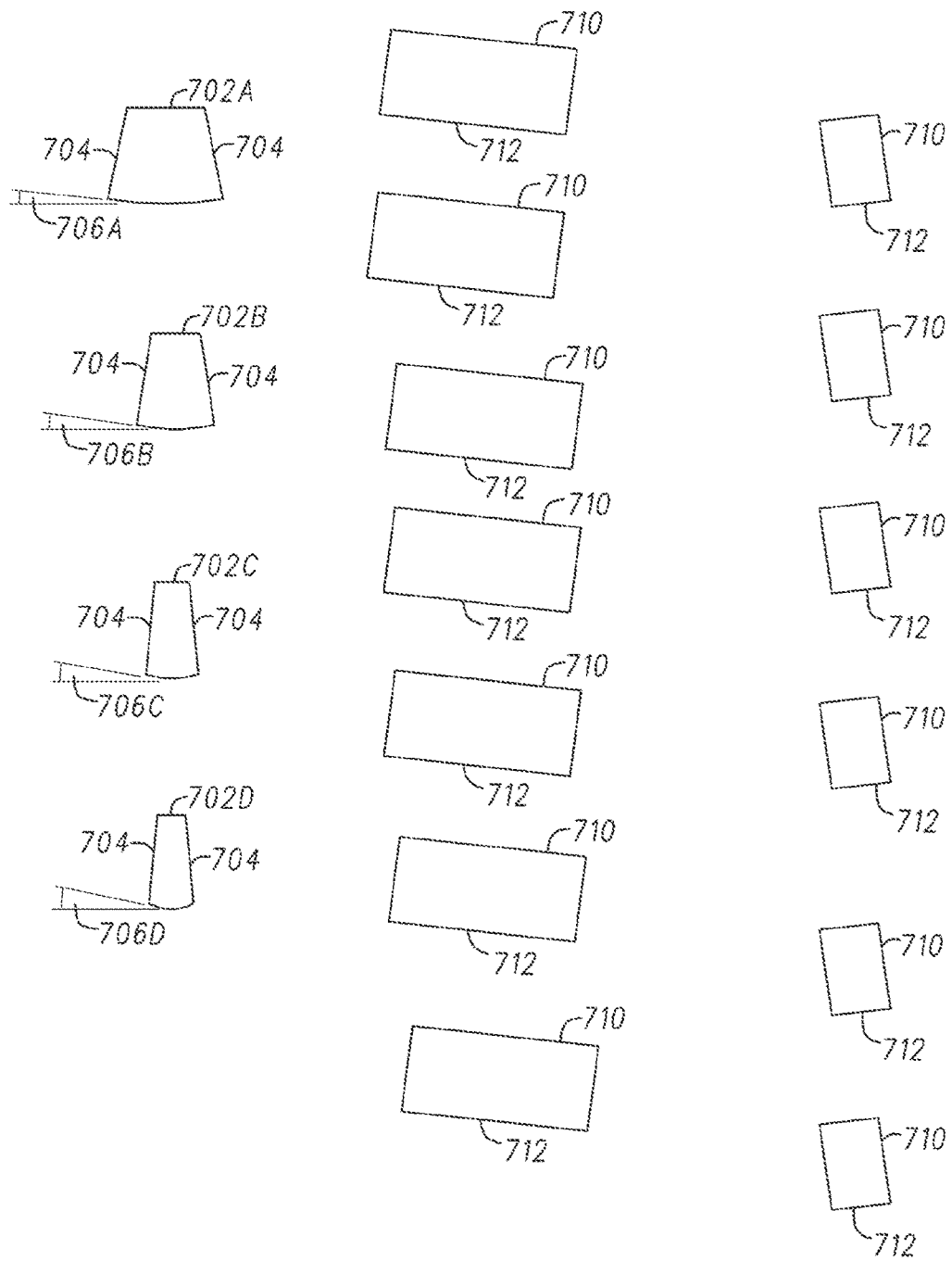
FIG. 8 is a schematic view of modular components of the fabrication system shown in FIG. 7.

Referring now to FIG. 8, a plurality of components of the fabrication assembly 700 are provided. The fabrication assembly 700 is shown in a separated configuration with a plurality of keystone segments 702A-D. The keystone segments 702A-D (e.g., variations of the keystone segment 702 of FIG. 7) facilitate the generation of one or more gores having a plurality of angles for straight line edges, such as the upper and lower angles 412, 413 shown in FIGS. 4A, B. That is to say, because of the scaleability of the straight line gores 108 shown in FIGS. 4A, B the fabrication assembly 700 is readily scaled with the keystone segments 702A-D to generate a plurality of gore shapes having differing interface angles 706 (corresponding to the upper and lower angles 412, 413) and lengths with a single assembly that is modularly assembled according to the specifications of a particular article or inflatable balloon such as the atmospheric balloon 100 shown in FIG. 1.

Referring again to FIG. 8, as shown a plurality of keystone segments 702A, B, C, D are provided to show varying interface angles 706A-D that differ according to the size and shape of the keystone segments 702A-D. For instance, the first keystone segment 702A includes a first interface angle 706A and accordingly positions its interfaces 704 at a corresponding angle to the interface angle 706A. Similarly each of the other keystone segments 702B, 702C, 702D provide differing interface angles 706B, 706C, 706D that orient their interfaces 704 according to the respective interface angles to provide composite straight line cutting edges to generate corresponding gores that have one or more upper or lower straight line gore edges 110, 112 (see FIGS. 4A, B).

As further shown in FIG. 8, the fabrication assembly in one example includes a plurality of cutting edge segments 710 having varying sizes (e.g., lengths) and corresponding component cutting edges 712. As previously described herein the component cutting edges 712 are aligned as the fabrication assembly 700 is assembled along the keystone segment 702. That is to say, the component cutting edges 712 are aligned with the keystone cutting edge 708 to accordingly provide a composite straight line cutting edge 714 (see FIG. 7) extending a length corresponding to the straight line gore edges 110, 112 of the specified gore 108. In another example, the fabrication assembly 700 includes a plurality of intermediate segments 718 each of which has a curved or angled face sized and shaped to correspond to the keystone cutting edge 708 associated with the desired gore. That is to say the intermediate segments 718 provide a corresponding fit with the keystone segments such as the keystone segments 702A-D when the fabrication assembly 700 is for instance assembled in a complementary fashion with the second fabrication assembly (such as the fabrication assembly 900 shown in FIG. 9) to generate a plurality of gores in a staggered fashion as will be described herein. Further, the intermediate segments 718 optionally have a complementary interface to the interfaces 704 (e.g., at the interface angles) of the keystone segments 702A-D and thereby facilitate the continued repetition of the specified gore pattern (cutting template) at additional stations for cutting additional gores along the fabrication assembly 700.

In another example, the fabrication assembly 700 including the plurality of segments (keystone, intermediate and cutting edge segments) is in one example provided as a series of rolling tables, movable surfaces or the like that are readily coupled to one another for instance with one or more fasteners, clamps or the like. The coupling between the segments is optionally automatic and includes one or more of biased clips or clamps that are triggered with engagement between the segments. Alternatively a manual clip, clamp or the like is operated to couple the segments. In another example, the segments are coupled with one or more of screws, nails or the like when a desired gore profile such as the gore profile shown in FIGS. 4A, B is specified and the fabrication assembly 700 remains in that particular template or form until the specification of another profile. The segments of the fabrication assembly 700 are then pulled apart (in the case of clips or clamps and the like readily pulled apart) to facilitate the rearrangement of the components into a newly desired straight line gore profile for instance including one or more of the other keystone segments such as one of the segments 702A-D.

In operation, the fabrication assembly 700 is assembled as previously described herein. For instance, one or more of the keystone segments 702A-D is chosen according to one or more of the desired upper or lower angles 412, 413 of the gore 108 (based on whether the gore will include both the upper gore portion 400 or the lower gore portion 402). After selection of the keystone segment (e.g., the keystone segment 702A as an example) cutting edge segments 710 are assembled in an end-to-end fashion starting at the interface 704 of the keystone segments 702. The component cutting edges 712 of the cutting edge segments 710 are aligned with the keystone cutting edge 708 and the cutting edge segments and the keystone segment 702 are coupled together to form a composite straight line cutting edge 714 corresponding to the desired profile of the gore such as the gores 108 shown in FIGS. 4A, B.

In another example, with the keystone segment selected (e.g., keystone segment 702A) the fabrication assembly 700 is readily scaled between a configuration with a first number of cutting edge segments 710 to another configuration with additional or fewer cutting edge segments 710. For instance, in one example the fabrication assembly is scaled to produce larger or smaller atmospheric balloons according to the desired specifications of the article (e.g., including specified larger or smaller gores).

In another example, the fabrication assembly 700 is broken apart and a second keystone segment, for instance the keystone segment 702D, is provided with an interface angle such as the interface angle 706D that provides a shallower cutting edge. The corresponding gores include smaller upper and lower angles 412, 413 used, for example, with a balloon that requires a larger number of gores 108.

After assembly of the fabrication assembly 700 the balloon membrane material 716 as shown in FIG. 7 is positioned along the fabrication assembly 700 for instance with one or more alignment features 722. In one example, the alignment features 722 are one or more of stenciled patterns, projections, flanges or the like provided on the fabrication assembly 700 for instance on the keystone segments 702 and the intermediate segments 718 to provide guides for the positioning of the edge of the balloon membrane material 716 for cutting into gores, such as the gores 108 shown for instance in FIGS. 4A, B. That is to say, as the balloon membrane material 716 is aligned with these alignment features 722 the balloon membrane material 716 is positioned so that cutting along the composite straight line cutting edge 714 accordingly generates at least a portion of the gores 108.

The balloon membrane material 716 is cut along the composite straight line cutting edge 714 according to the interface angle 706 of the keystone segment 702 and the corresponding orientation of the assembled cutting edge segments 710 at the cutting edge angle 715 (based on the interface angle 706). The resulting gore or gore portion accordingly includes one or more of upper and lower straight line gore edges 110, 112 that extend between upper and lower apexes and an equator at the specified angles (e.g., the upper and lower angles 412, 413) and lengths of the gore 108. Optionally, the gore 108 has a gore edge 110' along the free (uncut) edge of the balloon membrane material 716. The gore edge 110' extends along the what is otherwise the gore midline 410 in FIG. 4A. As previously discussed and shown in FIGS. 1 and 4B, the gore edge 110' is joined along another gore edge 110' to form a virtual gore including the joined mirror image gore portions.

In one example, the balloon membrane material 716 is provided in a tubular configuration or a folded configuration so that a folded edge of the balloon membrane material 716 is provided along the alignment features 722 of the fabrication assembly 700 (e.g., at the keystone segment 702 and one or more of the intermediate segments 718). Cutting of the (folded or tubular) balloon membrane material 716 along the composite straight line cutting edge 714 thereby generates a folded gore 108 (e.g., folded along the gore midline 410). In such an example the gore midline 410 as shown in FIG. 4A is automatically provided along the alignment features 722. Unfolding of the cut balloon membrane material 716 reveals a full gore 108 having identical upper and lower straight line gore edges 110, 112.

FIG. 9 shows a schematic view of another example of a fabrication system 901 including a plurality of fabrication assemblies. As shown, the fabrication system 901 includes the fabrication assembly 700 (a first fabrication assembly 700 shown in FIG. 7) and a second fabrication assembly 900 positioned adjacent to the fabrication assembly 700 in a complementary configuration. In at least some regards the second fabrication assembly 900 is configured and constructed with one or more components similar to the components used in the fabrication assembly 700. For instance, the second fabrication assembly 700 includes keystone segments 902 with keystone cutting edges 904 and cutting edge segments 710 coupled with the keystone segments 902 and extending at angles according to the interface angles of the keystone segments 902.

Each of the fabrication assemblies 700, 900 is shown in the example of FIG. 9 with multiple stations 922-932 (three are shown in FIG. 9 and in other examples there are fewer or more) configured for generation of multiple articles or portions of articles. For instance, the fabrication assembly 700 includes a plurality of stations 922-926 interconnected in an end to end configuration through interconnected keystone segments 702, cutting edge segments 710 and intermediate segments 718). The balloon membrane material 716 is positioned along each of the stations 922-926 to thereby allow for continuous cutting of the material across each of the stations for generation of a plurality of gores. Similarly, the second fabrication assembly 900 includes exemplary stations 928-932 that facilitate the generation of a plurality of gores (e.g., for articles such as atmospheric balloons).

In the example shown in FIG. 9, the interface angles of the keystone segments 902 are similar to or identical to the interface angles 706 shown for instance in FIG. 7 for the keystone segments 702. Accordingly, the cutting edge segments 710, when coupled with the keystone segments 902, provide the second fabrication assembly 900 with a complementary configuration to the first fabrication assembly 700. That is to say, the cutting edge segments 710 of the second fabrication assembly 900 and the keystone segments 902 provide a complementary or similar second composite straight line cutting edge 906 to the composite straight line cutting edge 714 of the first fabrication assembly 700. The complementary profile of each of the straight line cutting edges 714, 906 allows for the complementary interfitting of the fabrication assembly 700 with the second fabrication assembly 900.

As will be described herein, the complementary fit of the first and second fabrication assemblies 700, 900 facilitates the production of multiple articles such as articles at the stations 922-932 as shown in FIG. 9. In one example the plurality of articles are identically shaped gores, for instance the gores 108 used in articles such as the atmospheric balloon 100 (FIG. 1). In another example, where multiple plies of the balloon membrane material 716 are applied on the fabrication surfaces 720 and 920 of the fabrication system 901 a plurality of (stacked) gores are provided at each of the stations 922-932. Accordingly, entire balloons, articles or portions of the same are constructed at each of the stations 922-932.

Referring again to FIG. 9 the second fabrication assembly 900 as previously described herein has in one example a complementary configuration to that of the first fabrication assembly 700. For instance, the second fabrication assembly 900 has a modular construction including one or more keystone segments 902 having corresponding keystone cutting edges 904. The keystone segments 902 in one example are similar to one or more of the plurality of keystone segments 702A-D shown for instance in FIG. 8. For instance the keystone segments have a variety of interface angles such as the interface angle 706A-D to provide a variety of corresponding interfaces at varying angles, position the composite straight line cutting edge 906 and generate corresponding gores having differing upper and lower angles such as the upper and lower angles 412, 413 shown for instance in FIGS. 4A. B.

As further shown in FIG. 9 one or more cutting edge segments 710 are coupled along the interfaces of the keystone segments 902 to accordingly provide component cutting edges 712 to form the upper and lower straight line gore edges 110, 112 (FIGS. 4A, B). In the complementary configuration shown the cutting edge segments 710 of the second assembly 900 are arranged in a corresponding fashion to the cutting edge segments 710 of the first fabrication assembly 700 (e.g., with regard to length, angle and the like). In still another example, the second fabrication assembly 900 further includes one or more intermediate segments 718. In one example, the intermediate segments 718 provide junctions or interfaces between each of the stations 928-932 of the second fabrication assembly 900 corresponding in a similar manner to the intermediate segments for the fabrication assembly 700.

In one example the assemblies 700, 900 are assembled in a complementary configuration with the composite straight line cutting edge 714 and the second composite straight line cutting edge 906 extending along one another in an interfit pattern. Each of the first and second composite straight line cutting edges 714, 906 form a shared straight line cutting edge 908 that extends between each of the first and second fabrication assemblies 700, 900 to thereby provide a template or cutting edge along which the balloon membrane materials 716 is cut to form staggered articles or gores (for use with articles).

In operation, the fabrication system 901 including the first and second fabrication assemblies 700, 900 are assembled (mated) in a complementary configuration shown in FIG. 9. The balloon membrane material 716 is laid across the fabrication surface 720 of the first fabrication assembly 700 and the fabrication surface 920 of the second fabrication assembly 900. In one example, the balloon membrane material 716 is aligned with one or more alignment features 722 provided on one or more of the keystone segments 702, 902 of one or more of the first and second fabrication assemblies 700, 900.

With the balloon membrane materials 716 aligned along the first and second fabrication assemblies 700, 900 a cutting tool including, but not limited to, shears, an automated cutter (knife, heated knife, heated wire or the like), an automated cutter and sealer or the like is moved along the fabrication system 901 along the shared straight line cutting edge 908. As described herein, the shared straight line cutting edge 908 is, in an example, formed by the component cutting edges of each of the keystone segments 702, 902 as well as the cutting edge segments 710 (and optionally the intermediate segments 718). As the balloon membrane material 716 is cut one or more gores are formed at each of the stations 922-932 (e.g., one or more gores for each of the stations).

As previously described herein, the angles for the gores, for instance the upper and lower angles 412, 413 for the corresponding upper and lower straight line gore edges 110, 112 are cut into the balloon membrane material 716 to form the gores 108 according to the interface angles 706 (and corresponding cutting edge angles 715) of each of the keystone segments 702, 902. The interface angles 706 of the keystone segments 702, 902 orient composite straight line cutting edges 714, 906 extending at first and second cutting edge angles 715, 907 as shown in FIGS. 7 and 9. The corresponding gores cut out of the balloon membrane material 716 (according to the composite straight line cutting edges 714, 906) thereby have upper and lower straight line gore edges 110, 112 extending along the desired profiled angles for instance the upper and lower angles 412, 413 shown in FIGS. 4A, B.

After cutting the balloon membrane material 716 into one or more gores at each of the stations 922-932, in one example the first and second fabrication assemblies 700, 900 are split apart from each other (e.g., decoupled from one another). That is to say, the shared straight line cutting edge 908 serves as a separation feature and allows for the separation of the first and second fabrication assemblies 700, 900. In an example, where multiple plies of the balloon membrane material 716 (e.g., stacked sheets of the material) are cut at each of the stations 922-932 multiple seals are formed along the cut (straight line) edges of the gores to accordingly attach the gores together in a stacked configuration to form one or more articles such as the atmospheric balloon 100. A sealer, such as a heat sealer, adhesive sealer, tape sealer, sewing mechanism or the like is run along the open edges of each of the stacked gores 108 provided at the stations 922-932 to seal the gores 108 along their cut edges (that are automatically aligned because of the stacked cutting conducted along the composite straight line cutting edges 714, 906).

In another example, where the first and second fabrication assemblies 700, 900 include multiple stations 922-926, 928-932 (respectively) for articles the balloon membrane material 716 is severed at the interface of each of the stations 922-926 or 928-932 (at locations between the illustrate brackets for each of the stations) to thereby form singulated gores 108 relative to other lineal portions of the balloon membrane material 716.

As previously described herein each of the first and second fabrication assemblies 700, 900 is constructed in a modular fashion to thereby readily allow for and facilitate the scaling up or down of each of the stations 922-932. For instance, where larger articles having a similar interface angle are desired one or more cutting edge segments 710 are added between keystone segments 702, 902 and optional intermediate segments 718. Similarly, where a decreased article size is desired one or more of the cutting edge segments 710 is removed. Where a differing interface angle is desired one or more of the keystone segments, for instance the keystone segments 702A-D shown in FIG. 8, are used in one or more of the first fabrication assembly 700 and the second fabrication assembly 900 to thereby adjust the first and second cutting edge angles 715, 907. The reoriented cutting edge angles 715, 907 (based on the selected keystone segments 702A-D) facilitate cutting of the balloon membrane material 716 to generate gores 108 having upper and lower straight line gore edges 110, 112 at the specified upper and lower angles 412, 413.

Figure 10:
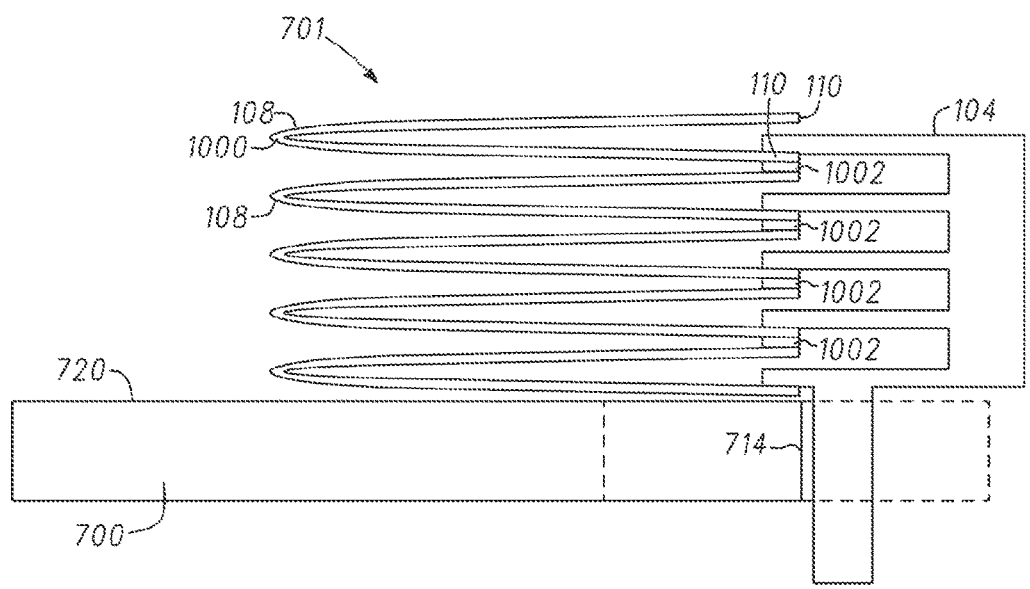
FIG. 10 is a cross sectional view of one example straight line gores stacked and ready for joining on the fabrication system of FIG. 7 or 9.

FIG. 10 shows a cross-sectional view of a plurality of gores 108 in a stacked configuration. In one example the plurality of gores 108 are formed with one or more of the fabrication assemblies 700, 900 of the fabrication systems 701, 901. In the view shown in FIG. 10, the balloon membrane material includes a number of separate layers (plies) folded at one or more folds 1000 and stacked. In another example, the folds 1000 correspond to folds of the balloon membrane material 716 in a layered configuration with a single sheet of the balloon membrane material folded multiple times at the folds 1000 (and additional folds cut away from the view shown in FIG. 10) to form corresponding multiple plies. In still another example, where the balloon membrane material 716 is in a tubular format the tubes are folded at first and second material edges (corresponding to one of the folds 1000) to facilitate the generation of a plurality of gores, for instance along each of the first and second fabrication assemblies 700, 900 shown for instance in FIG. 9. Stated another way, the fold 1000 of a tubular piece of material shown with the first fabrication assembly 700 is duplicated along another fold line on the second fabrication assembly 900. For multiple stacked gores 108 as shown in FIG. 10, multiple tubular pieces of material are folded at opposed folds 1000, stacked and then cut along the composite straight line cutting edge 714.

The balloon membrane material is cut along the composite straight line cutting edge 714 of the first fabrication assembly 700 (the cross-section of FIG. 10 shows a midpoint of the straight line cutting edge 714 for instance between the keystone cutting edge 708 and a corresponding cutting edge of the intermediate segment 718). As previously described herein, the balloon membrane material cut along the composite straight line cutting edge 714 is formed into a plurality of stacked gores 108 having one or more of upper and lower straight line gore edges 110, 112. The plurality of gores 108 are formed at substantially the same time with the passage of a cutting tool for instance shears, heated knife, heated wire or the like along the composite straight line cutting edge 714 of the first fabrication assembly 700. The cut edges of the stacked balloon membrane material (corresponding to the upper straight line gore edges 110) are automatically aligned according to cutting along the edge 714.

With the plurality of gores 108 in the stacked configuration another tool or a composite tool included with the cutting tool, for instance a joining mechanism 1004, is passed along the upper and lower straight line gore edges 110 to join each of the gores 108 at their edges, for instance to form a composite article such as the atmospheric balloon 100 or other inflatable article. A plurality of seams 1002 are shown formed between each of the gores 108. In one example, the joining mechanism 1004 is passed along the composite straight line cutting edge 714 to form each of the seams 1002 by way of adhesives, heat, stitching or the like at the same time. The example joining mechanism 1004 shown in FIG. 10 includes a plurality of arms nested between the gores 108. The arms of the joining mechanism 1004 form the seams 1002 as the mechanism moves along the straight line gore edges 110 (e.g., by heating with band sealers, heated plate or bar sealers, ultrasonic sealers, stitching assemblies, adhesive applicators or the like). In another example, the joining mechanism 1004 is passed multiple times along the composite straight line cutting edge 714 and the corresponding upper and lower straight line gore edges 110, 112 to thereby form the seams 1002 in a sequential fashion.

The assembled gores 108 are then readily removed from the fabrication surface 720. In another example, further processing including joining of exposed edges such as the upper and lower straight line gore edges 110 at the top and bottom gores 108 of the stack is conducted (e.g., to circumferentially close a balloon). In another example tendons, upper and lower apex fittings, a payload and the like are coupled with the assembled gores 108 to accordingly form one or more articles including, but not limited to, an atmospheric balloon 100 (FIG. 1) or other inflatable article.

Figure 11:
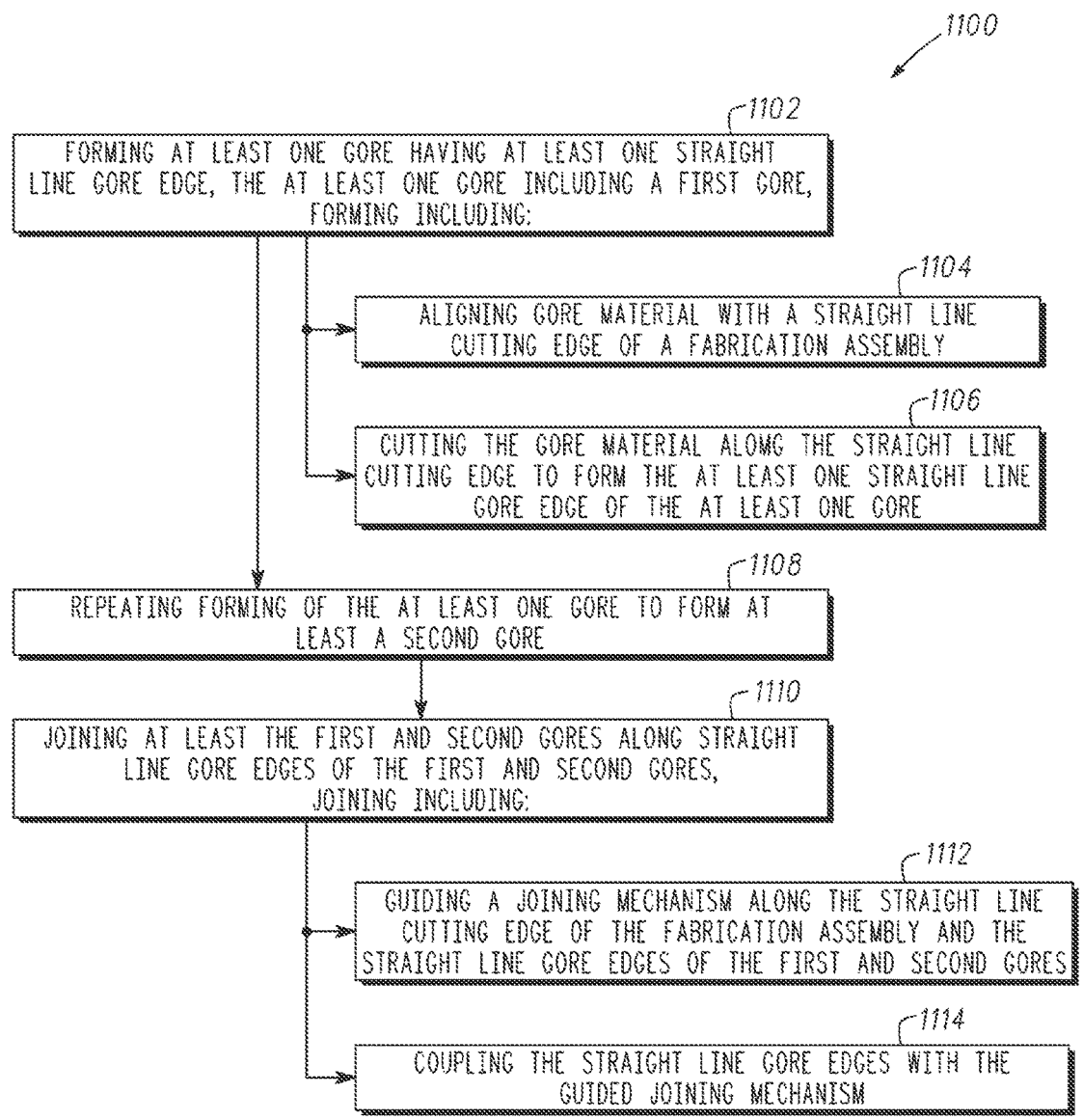
FIG. 11 is a block diagram of one example of a method for assembling an article.

FIG. 11 shows one example of a method 1100 for assembling an article for instance an inflatable atmospheric balloon 100 or other inflatable structure. In describing the method 1100 reference is made to one or more components, features, functions and steps previously described herein. Where convenient, reference is made to the components, features, steps and the like with reference numerals. Reference numerals provided are exemplary and are not exclusive. For instance, components, features, functions, steps and the like described in the method 1100 include, but are not limited to, the corresponding numbered elements provided herein, other corresponding features described herein (both numbered and unnumbered) as well as their equivalents.

At 1202, the method 1100 includes forming at least one gore, such as the gore 108, having at least one straight line gore edge 110, 112. The at least one gore 108 includes a first gore. Forming in one example includes at 1104 aligning gore material 716 with a straight line cutting edge, such as a composite straight line cutting edge 714 shown in FIGS. 7 and 9 of one or more of the fabrication assemblies 700, 900 of the fabrication systems 701, 901. The gore material 716 is cut along the straight line cutting edge (e.g., the composite straight line cutting edge 714) to form the at least one straight line gore edge (one or more of the upper or lower straight line gore edges 110, 112) of the at least one gore at 1106. Forming the at least one gore is repeated at 1108 to form at least a second gore for instance a gore 108 similar or identical to the previously constructed first gore 108.

The method 1100 further includes at 1110 joining at least the first and second gores 108 along straight line gore edges, such as the upper and lower straight line gore edges 110, 112 (FIGS. 4A, B), or along straight line gore edges corresponding to the gore edges 110' (FIG. 4B). In one example, joining includes at 1112 guiding a joining mechanism 1004 (e.g., sewing machine, adhesive bonder, heat sealer or the like) along the straight line cutting edge (e.g., one or more of the composite straight line cutting edge 714, second composite straight line cutting edge 906 or shared straight line cutting edge 908 formed by both as shown for instance in FIG. 9). Guiding of the joining mechanism 1004 along the straight line cutting edge readily aligns the joining mechanism 1004 with the upper and lower straight line gore edges 110, 112 for coupling of the gores 108 together. At 1114, the guided joining mechanism 1004 couples the straight line gore edges 110, 112. One example of joining the straight line gore edges including one or more of the upper and lower straight line gore edges 110, 112 is shown in FIG. 10. As shown the gores 108 are in a stacked configuration with the gore materials 716 provided in a series of plies that are then cut along the composite straight line cutting edge 714 to form each of the gores 108. The upper and lower straight line gore edges 110, 112 are then joined at one or more seams 1002 between each of the gores 108. The joining mechanism 1004 is guided along the straight line cutting edge 714 in one example to join the gores 108 at each of the seams 1002 in a single pass along the composite straight line cutting edge 714. In another example, the joining mechanism 1004 (or another version of the joining mechanism) conducts multiple passes along the straight line cutting edge 714 to form each of the seams 1002. In another example, the method 1100 includes joining the gores 108 (e.g., mirror image gores as shown in FIG. 4B) along gore edges 110'. Joining along the gore edges 110' of each of the gores 108 provides a composite gore 108 similar to the gore 108 shown in FIG. 4A.

The method 1100 includes one or more options as described herein. In one example, the method 1100 includes stacking the gore material 716 as previously discussed herein. The stacked gore material is aligned with a straight line cutting edge, for instance the composite straight line cutting edge 714, the second composite straight line cutting edge 906 or the shared straight line cutting edge 908. The stacked gore material 716 is cut along the straight line cutting edge (one or more of the cutting edges 714, 906, 908) to form a plurality of straight line gore edges (e.g., one or more of edges 110, 112) of a plurality of gores 108. In one example, at least the first and second gores previously described with regard to the method 1100 are stacked with each of their respective straight line gore edges (one or more of the straight line gore edges 110, 112 shown in FIGS. 4A, B) automatically aligned with each other by their cutting along an identical cutting edge (edge 714, edge 906, or a shared straight line cutting edge 908).

In one example, aligning the balloon membrane material 716 (or material for an article) with the straight line cutting edge includes aligning a gore material edge for instance one or more plies of balloon membrane material 716 with a fabrication assembly alignment feature 722 (FIGS. 7 and 9). In one example alignment features 722 are provided on one of the first and second fabrication assemblies 700, 900. At least one of the edges of the balloon membrane material 716 is aligned along the alignment feature 722 of the respective fabrication assembly (e.g., assembly 700) to automatically align the opposed edge of the gore material along the other fabrication assembly (e.g., assembly 900). In another example, both of the first and second fabrication assemblies 700, 900 include alignment features 722 to facilitate the alignment of both edges of the gore material 716 relative to the respective assemblies 700, 900.

In another example, the straight line cutting edge of the fabrication assembly (one or more of the assemblies 700, 900) is a shared straight line cutting edge 908 shared between the mated first and second fabrication assembly 700, 900. Accordingly, forming the at least one gore 108 includes forming a plurality of gores between the fabrication assemblies. The balloon membrane material 716 (e.g., an article material) is aligned with the alignment feature 722 of the fabrication assembly 700 and the gore material 716 is spread over the fabrication surfaces 720, 920 of the respective first and second fabrication assemblies 700, 900. As shown in FIG. 9, the balloon membrane material 716 is spread across the shared straight line cutting edge 908. Cutting the balloon membrane material 716 as previously described herein includes cutting the material along the shared straight line cutting edge 908 to form at least a first gore 108 and a complementary second gore 108 at the same time. Accordingly, the at least one straight line gore edge (at 1006) for each of the gores 108 includes a complementary straight line gore edge for each of the first and second gores 108 according to the shared straight line cutting edge 908 of the fabrication system 901.

Optionally, the balloon membrane material 716 includes a cylinder of gore material such as a folded cylinder of gore material and the gore material edge includes a first gore material edge corresponding to a fold 1002 (FIG. 10) and a second gore material edge including an opposed fold (similar to fold 1002) of the balloon membrane material 716 (cut away in FIG. 10). The tubular or cylindrical gore material 716 is cut along the straight line cutting edge (one or more of a shared straight line cutting edge 908 or the first and second composite straight line cutting edges 714, 906) to form the first gore 108 and the complementary second gore 108. Cutting forms straight line gore edges 110 for the stacked first gores 108 on the first fabrication assembly 700 in FIG. 10 and similarly (with the second fabrication assembly 900) forms straight line gore edges for the complementary second gore 108 at the same time. Further, and as described herein, cutting of the folded gore material away from the folds 1002 and along the composite straight line cutting edge 714 forms each of the sides of the gore 108 (see FIGS. 4A, B) including the upper and lower straight line gore edges 110, 112 associated with each of the sides (left and right) of the gore 108. Optionally, the gore edges 110' (e.g., the free edge of the gore or centerline gore edge) for the component gores 108 shown in FIG. 4B, are formed by a supplemental cutting procedure along another straight line cutting edge or correspond to the free edges of the balloon membrane material 716, for instance aligned along the alignment feature 722.

In another example, forming the straight line cutting edge (e.g., one or more of the cutting edges 714, 906, 908) includes selecting a keystone segment, such as the segment 702 of the fabrication assembly 700. The keystone segment 702 as described herein includes at least one interface 704 directed along an interface angle 706 corresponding to a specified angle of the straight line cutting edge (corresponding to one or more of the specified upper or lower angles 412, 413 of the gore 108 as shown in FIGS. 4A, B). The method 1100 further includes coupling cutting edge segments 710 with the keystone segments 702. The cutting edge segments 710 include component cutting edges 712 of the composite straight line cutting edge 714. The component cutting edges 712 extend at the angle of the straight line cutting edge according to the interface angle 706 of the keystone segments 702. In one example, as shown in FIG. 7, the interface angle 706 corresponds to a cutting edge angle 715 for the overall composite straight line cutting edge 714. That is to say, the composite straight line cutting edge 714 is positioned an angle (the cutting edge angle 715) according to the interface angle 706 provided by the keystone segments 702 and its corresponding interface 704 and the interface angle 706. In another example, coupling the cutting edge segments includes aligning the component cutting edges 712 of the cutting edge segments 710 to form the composite straight line cutting edge 714. In yet another example, the keystone segment 702 includes an optional keystone cutting edge 708. In one example, the keystone cutting edge 708 has one or more of a straight or curved configuration to thereby facilitate the provision of a corner at the keystone segment 702, for instance to provide the corner of the corresponding gore 108 including for instance a gore fillet 414 (See FIGS. 4A, B). In such an example the keystone cutting edge 708 as well as the cutting edge segments 710 are aligned to thereby form the composite straight line cutting edge 714 shown for instance in FIG. 7.

In still another example, the method 1100 includes resizing the composite straight line cutting edge 714 by coupling or decoupling one or more of the cutting edge segments 710 with respect to the remaining cutting edge segments 710 and the keystone segment 702. For instance, by adding one or more cutting edge segments 710 a correspondingly larger gore 108 including identical upper and lower angles 412, 414 is generated. In contrast, the removal of one or more of the cutting edge segments 710 allows for the generation of a balloon gore or inflatable article gore 108 of a smaller size (e.g., height and width of the balloon or article) but otherwise with identical upper and lower angles 412, 413. The fabrication assemblies 700, 900 are thereby readily scaled for the production of a plurality of gore sizes (and corresponding articles) based on the scaling up or down of the assemblies. Similarly, the keystone segment 702 is exchanged for another keystone segment having a different interface angle 706A-D to reconfigure the fabrication assembly (700, 900) for the production of gores 108 with corresponding different specified upper and lower angles 412, 413.

In still another example, the modular components of the fabrication assembly 700 are coupled with corresponding modular components of a second fabrication assembly, such as the fabrication assembly 900 shown for instance in FIG. 9. Optionally, these first and second fabrication assemblies 700, 900 as part of an overall fabrication system 901 are coupled together (mated) in a complementary configuration. The straight line cutting edges (e.g., composite edges 714, 906) are coupled (mated) together to form a shared straight line cutting edge 908 extending between each of the fabrication assemblies 700, 900.

Various Notes & Examples

Example 1 can include subject matter, such as can include an atmospheric balloon comprising: an upper apex; a lower apex; and a balloon membrane, the balloon membrane includes a plurality of balloon gores, each of the plurality of balloon gores extends between the upper and lower apexes, and one or more of the balloon gores of the plurality of balloon gores includes: upper straight line gore edges, lower straight line gore edges, wherein the upper and lower straight line gore edges are coupled along corresponding upper and lower straight line gore edges of adjacent balloon gores of the plurality of balloon gores, and an equator between the upper and lower straight line gore edges.

Example 2 can include, or can optionally be combined with the subject matter of Example 1, to optionally include wherein the balloon membrane has upper and lower disk panels, each of the upper and lower disk panels includes the plurality of balloon gores, and in a spread deflated configuration the upper straight line gore edges extend across the upper disk panel as straight lines between the upper apex and the equator, and the lower straight line gore edges extend across the lower disk panel as straight lines between the lower apex and the equator.

Example 3 can include, or can optionally be combined with the subject matter of one or any combination of Examples 1 or 2 to optionally include wherein each of the one or more gores of the plurality of balloon gores includes a gore mid line between the upper and lower straight line gore edges, and an upper angle of the upper straight line gore edges relative to the gore midline is constant from between the upper apex and the equator, and a lower angle of the lower straight line gore edges relative to the gore midline is constant from between the equator and the lower apex.

Example 4 can include, or can optionally be combined with the subject matter of one or any combination of Examples 1-3 to optionally include wherein the upper apex includes an upper apex fitting, and the upper straight line gore edges extend from the upper apex fitting toward the equator.

Example 5 can include, or can optionally be combined with the subject matter of one or any combination of Examples 1-4 to optionally include wherein the one or more gores of the plurality of gores each have a diamond shape according to the upper and lower straight line gore edges.

Example 6 can include, or can optionally be combined with the subject matter of Examples 1-5 to optionally include wherein the upper straight line gore edges meet the lower straight line gore edges at gore fillets at the equator.

Example 7 can include, or can optionally be combined with the subject matter of Examples 1-6 to optionally include an article comprising: an article membrane having a plurality of gores, the plurality of gores include at least first and second gores: the first gore includes first and second straight line gore edges and a first gore midline between the first and seconds straight line gore edges, and a first angle of the of the first and second straight line gore edges relative to the gore midline is constant along the first and second straight line gore edges, the second gore includes third and fourth straight line gore edges and a second gore midline between the third and fourth straight line gore edges, and a second angle of the of the third and fourth straight line gore edges relative to the gore midline is constant along the third and fourth straight line gore edges, and wherein the first and second gores are coupled along one or more of the first and second straight line gore edges of the first gore to one or more of the third and fourth straight line gore edges of the second gore.

Example 8 can include, or can optionally be combined with the subject matter of Examples 1-7 to optionally include wherein the article membrane includes a balloon membrane.

Example 9 can include, or can optionally be combined with the subject matter of Examples 1-8 to optionally include wherein the article membrane includes an inflatable structure membrane.

Example 10 can include, or can optionally be combined with the subject matter of Examples 1-9 to optionally include an inflation port coupled with at least one of the first or second gores.

Example 11 can include, or can optionally be combined with the subject matter of Examples 1-10 to optionally include a fluid pump in communication with the article membrane, the fluid pump configured to inflate the article membrane into an inflated configuration.

Example 12 can include, or can optionally be combined with the subject matter of Examples 1-11 to optionally include an article assembly method comprising: forming at least one gore having at least one straight line gore edge, the at least one gore including a first gore, forming including: aligning gore material with a straight line cutting edge of a fabrication assembly, and cutting the gore material along the straight line cutting edge to form the at least one straight line gore edge of the at least one gore; repeating forming of the at least one gore to form at least a second gore; and joining at least the first and second gores along straight line gore edges of the first and second gores, joining including: guiding a joining mechanism along the straight line cutting edge of the fabrication assembly and the straight line gore edges of the first and second gores, and coupling the straight line gore edges with the guided joining mechanism.

Example 13 can include, or can optionally be combined with the subject matter of Examples 1-12 to optionally include wherein forming at least one gore and repeating forming includes: stacking gore material, aligning gore material includes aligning the stacked gore material with the straight line cutting edge of the fabrication assembly, and cutting the gore material includes cutting the stacked gore material along the straight line cutting edge to form a plurality of straight line gore edges, wherein the cut stacked gore material includes at least the first and second gores stacked with each of the straight line gore edges of the plurality of straight line gore edges aligned.

Example 14 can include, or can optionally be combined with the subject matter of Examples 1-13 to optionally include wherein joining at least the first and second gores includes: guiding the joining mechanism includes guiding the joining mechanism along the aligned straight line gore edges of at least the stacked first and second gores, and coupling the straight line gore edges includes coupling the aligned straight line gore edges of at least the stacked first and second gores.

Example 15 can include, or can optionally be combined with the subject matter of Examples 1-14 to optionally include wherein aligning the gore material with the straight line cutting edge includes aligning a gore material edge with a fabrication assembly alignment feature.

Example 16 can include, or can optionally be combined with the subject matter of Examples 1-15 to optionally include wherein the straight line cutting edge of the fabrication assembly is a shared straight line cutting edge of the fabrication assembly and a second fabrication assembly, and forming at least one gore includes forming a plurality of gores including: aligning gore material with the straight line cutting edge includes aligning a gore material edge with a fabrication assembly alignment feature of the fabrication assembly, and spreading the gore material over the fabrication assembly and the second fabrication assembly, the gore material extending over the shared straight line cutting edge, cutting the gore material includes cutting the gore material along the shared straight line cutting edge to form the first gore and a complementary gore at the same time, wherein the at least one straight line gore edge includes complementary straight line gore edges for each of the first gore and the complementary gore according to the shared straight line cutting edge.

Example 17 can include, or can optionally be combined with the subject matter of Examples 1-16 to optionally include wherein the gore material includes a cylinder of gore material and the gore material edge includes a first gore material edge, the cylinder of gore material folded along the first gore material edge and a second gore material edge, and cutting the gore material along the straight line cutting edge to form the first gore and the complementary gore includes forming first and second straight line gore edges for the first gore and third and fourth straight line gore edges for the complementary gore at the same time.

Example 18 can include, or can optionally be combined with the subject matter of Examples 1-17 to optionally include wherein the gore material includes a folded gore material, the folded gore material folded along at least a first gore material edge, and cutting the gore material along the straight line cutting edge includes cutting the gore material to form first and second straight line gore edges of the at least one gore, the first and second straight line gore edges aligned along the straight line cutting edge.

Example 19 can include, or can optionally be combined with the subject matter of Examples 1-18 to optionally include forming the straight line cutting edge of the fabrication assembly including: selecting a keystone segment of the fabrication assembly, the keystone segment including at least one interface directed along an interface angle corresponding to an angle of the straight line cutting edge, coupling edge segments with the keystone segment, the edge segments including component cutting edges of the straight line cutting edge, and the component cutting edges extend at the angle of the straight line cutting edge according to the interface angle of the keystone segment.

Example 20 can include, or can optionally be combined with the subject matter of Examples 1-19 to optionally include wherein coupling the edge segments includes aligning the component cutting edges of the edge segments to form the straight line cutting edge.

Example 21 can include, or can optionally be combined with the subject matter of Examples 1-20 to optionally include resizing the straight line cutting edge of the fabrication assembly with coupling or decoupling one or more edge segments with respect to the edge segments previously coupled with the keystone segment.

Example 22 can include, or can optionally be combined with the subject matter of Examples 1-21 to optionally include wherein the keystone segment includes a keystone cutting edge and coupling the edge segments with the keystone segment includes interfacing the keystone cutting edge with the straight line cutting edge.

Example 23 can include, or can optionally be combined with the subject matter of Examples 1-22 to optionally include mating a second fabrication assembly with the fabrication assembly, mating including coupling the straight line cutting edge of the fabrication assembly with a second straight line cutting edge of the second fabrication assembly to form a shared straight line cutting edge.

Example 24 can include, or can optionally be combined with the subject matter of Examples 1-23 to optionally include a fabrication system for an article comprising: a first fabrication assembly including: at least one keystone segment, the at least one keystone segment includes: at least one interface directed along an interface angle corresponding to a specified angle of a composite straight line cutting edge, and a keystone cutting edge, at least one cutting edge segment selectively coupled with the at least one keystone segment, the at least one cutting edge segment includes a component cutting edge, and wherein in an assembled configuration the at least one keystone segment and the at least one cutting edge segment form the composite straight line cutting edge: the composite straight line cutting edge includes the keystone cutting edge aligned with the component cutting edge of at least one cutting edge segment, and the composite straight line cutting edge extends at a cutting edge angle based on the interface angle of the at least one keystone segment.

Example 25 can include, or can optionally be combined with the subject matter of Examples 1-24 to optionally include wherein the keystone cutting edge of the at least one keystone segment includes a curved cutting edge portion.

Example 26 can include, or can optionally be combined with the subject matter of Examples 1-25 to optionally include wherein the at least one cutting edge segment includes a plurality of cutting edge segments, and in the assembled configuration the composite straight line cutting edge includes the keystone cutting edge aligned with the component cutting edges of the plurality of cutting edge segments.

Example 27 can include, or can optionally be combined with the subject matter of Examples 1-26 to optionally include wherein the at least one keystone segment includes a plurality of keystone segments, each of the interface angles of the keystone segments are different, and composite straight line cutting edges formed with each of the keystone segments are different according to the different interface angles.

Example 28 can include, or can optionally be combined with the subject matter of Examples 1-27 to optionally include a second fabrication assembly, the second fabrication assembly includes: a second keystone segment, the second keystone segment includes a second interface directed along the interface angle corresponding to the specified angle of the composite straight line cutting edge, and a second keystone cutting edge, at least a second cutting edge segment selectively coupled with the second keystone segment, the second cutting edge segment includes a second component cutting edge, and wherein in an assembled configuration at least the second keystone segment and the second cutting edge segment form a second composite straight line cutting edge: the second composite straight line cutting edge includes the second keystone cutting edge aligned with the second component cutting edge of at least the second cutting edge segment, and the second composite straight line cutting edge extends at a second cutting edge angle based on the interface angle of the at least one keystone segment.

Example 29 can include, or can optionally be combined with the subject matter of Examples 1-28 to optionally include wherein the first and second fabrication assemblies are configured for coupling in a complementary configuration, and in the complementary configuration the composite straight line cutting edge extends along the second composite straight line cutting edge to form a shared straight line cutting edge.

Example 30 can include, or can optionally be combined with the subject matter of Examples 1-29 to optionally include wherein the first fabrication assembly includes a fabrication assembly alignment feature configured to align a gore material with the composite straight line cutting edge.

Example 31 can include, or can optionally be combined with the subject matter of Examples 1-30 to optionally include wherein in the assembled configuration the first fabrication assembly has a fabrication surface including the at least one keystone segment and the at least one cutting edge segment, and the composite straight line cutting edge extends along the fabrication surface.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An atmospheric balloon comprising:
    an upper apex;
    a lower apex; and
    a balloon membrane, the balloon membrane includes a plurality of balloon gores, each of the plurality of balloon gores extends between the upper and lower apexes, and one or more of the balloon gores of the plurality of balloon gores includes:
        upper straight line gore edges,
        lower straight line gore edges, wherein the upper and lower straight line gore edges are coupled along corresponding upper and lower straight line gore edges of adjacent balloon gores of the plurality of balloon gores,
        an equator between the upper and lower straight line gore edges, and
        wherein the upper straight line gore edges extend from the upper apex toward the equator, and the lower straight line gore edges extend from the lower apex toward the equator.

2. The atmospheric balloon of claim 1, wherein the balloon membrane has upper and lower disk panels, each of the upper and lower disk panels includes the plurality of balloon gores, and
    in a spread deflated configuration the upper straight line gore edges extend across the upper disk panel as straight lines between the upper apex and the equator, and the lower straight line gore edges extend across the lower disk panel as straight lines between the lower apex and the equator.

3. The atmospheric balloon of claim 1, wherein each of the one or more gores of the plurality of balloon gores includes a gore mid line between the upper and lower straight line gore edges, and
    an upper angle of the upper straight line gore edges relative to the gore midline is constant from between the upper apex and the equator, and
    a lower angle of the lower straight line gore edges relative to the gore midline is constant from between the equator and the lower apex.

4. The atmospheric balloon of claim 1, wherein the upper apex includes an upper apex fitting, and the upper straight line gore edges extend from the upper apex fitting toward the equator.

5. The atmospheric balloon of claim 1, wherein the one or more gores of the plurality of gores each have a diamond shape according to the upper and lower straight line gore edges.

6. The atmospheric balloon of claim 1, wherein the upper straight line gore edges meet the lower straight line gore edges at gore fillets at the equator.

7. A balloon article comprising: an article membrane having a plurality of gores, the plurality of gores include at least first and second gores: the first gore includes first and second straight line gore edges and a first gore midline between the first and seconds straight line gore edges, and a first angle of the of the first and second straight line gore edges relative to the gore midline is constant along the first and second straight line gore edges between first and second ends of the first gore, the second gore includes third and fourth straight line gore edges and a second gore midline between the third and fourth straight line gore edges, and a second angle of the of the third and fourth straight line gore edges relative to the gore midline is constant along the third and fourth straight line gore edges between first and second ends of the second gore, and wherein the first and second gores are coupled along one or more of the first and second straight line gore edges of the first gore to one or more of the third and fourth straight line gore edges of the second gore.

8. The balloon article of claim 7, wherein the article membrane includes an inflatable structure membrane.

9. The balloon article of claim 7 comprising an inflation port coupled with at least one of the first or second gores.

10. The balloon article of claim 9 comprising a fluid pump in communication with the article membrane, the fluid pump configured to inflate the article membrane into an inflated configuration.

* * * * *